US009902112B2

(12) United States Patent
El-Siblani et al.

(10) Patent No.: US 9,902,112 B2
(45) Date of Patent: Feb. 27, 2018

(54) APPARATUS AND METHOD FOR FORMING THREE-DIMENSIONAL OBJECTS USING LINEAR SOLIDIFICATION AND A VACUUM BLADE

(71) Applicant: Global Filtration Systems, Dearborn Heights, MI (US)

(72) Inventors: Ali El-Siblani, Dearborn Heights, MI (US); Alexandr Shkolnik, Los Angeles, CA (US)

(73) Assignee: Global Filtration Systems, Dearborn Heights, MI (US)

( * ) Notice: Subject to any disclaimer, the term of this patent is extended or adjusted under 35 U.S.C. 154(b) by 334 days.

(21) Appl. No.: 14/680,484

(22) Filed: Apr. 7, 2015

(65) Prior Publication Data

US 2016/0297141 A1 Oct. 13, 2016

(51) Int. Cl.
*B29C 67/00* (2017.01)
*B33Y 30/00* (2015.01)
*B33Y 70/00* (2015.01)
*B29C 64/135* (2017.01)

(52) U.S. Cl.
CPC ........ *B29C 67/0066* (2013.01); *B29C 64/135* (2017.08); *B33Y 30/00* (2014.12); *B33Y 70/00* (2014.12)

(58) Field of Classification Search
CPC ............ B29C 67/0051; B29C 67/0055; B29C 67/0062; B29C 67/0066; B29C 67/0085; B33Y 10/00; B33Y 30/00
USPC ........................ 425/174.4, 375; 264/401, 494
See application file for complete search history.

(56) References Cited

U.S. PATENT DOCUMENTS

| 4,849,910 | A | 7/1989 | Jacobs et al. |
|---|---|---|---|
| 5,049,901 | A | 9/1991 | Gelbart |
| 5,104,592 | A | 4/1992 | Hull et al. |
| 5,236,637 | A | 8/1993 | Hull |
| 5,447,822 | A | 9/1995 | Hull et al. |
| 5,521,748 | A | 5/1996 | Sarraf |
| 5,631,763 | A | 5/1997 | Park |
| 5,753,171 | A | 5/1998 | Serbin et al. |
| 5,780,070 | A | 7/1998 | Yamazawa et al. |

(Continued)

FOREIGN PATENT DOCUMENTS

| DE | 19929199 A1 | 1/2001 |
|---|---|---|
| DE | 10256672 A1 | 6/2004 |

(Continued)

OTHER PUBLICATIONS

International Search Report and Written Opinion for PCT/US2012/044398, dated Oct. 26, 2012.

(Continued)

*Primary Examiner* — Matthew Daniels
*Assistant Examiner* — Lawrence D Hohenbrink, Jr.
(74) *Attorney, Agent, or Firm* — Hansen IP Law PLLC

(57) ABSTRACT

An apparatus and method for making a three-dimensional object from a solidifiable material using a linear solidification device with a vacuum blade is shown and described. In certain examples, the vacuum blade travels at a fixed distance relative to the linear solidification device as the linear solidification device travels along a travel axis. In other examples, the linear solidification device and the vacuum blade travel along the travel axis independently of one another.

10 Claims, 25 Drawing Sheets

(56) References Cited

U.S. PATENT DOCUMENTS

| | | | |
|---|---|---|---|
| 5,876,550 A | 3/1999 | Feygin et al. | |
| 5,885,511 A | 3/1999 | Heller et al. | |
| 5,922,364 A * | 7/1999 | Young, Jr. | B29C 67/0085 |
| | | | 264/401 |
| 5,991,102 A | 11/1999 | Oono et al. | |
| 6,030,199 A | 2/2000 | Tseng | |
| 6,180,050 B1 | 1/2001 | Arai et al. | |
| 6,267,919 B1 | 7/2001 | Tanaka et al. | |
| 6,372,178 B1 | 4/2002 | Tseng | |
| 6,406,658 B1 | 6/2002 | Manners et al. | |
| 6,560,248 B1 | 5/2003 | Vernackt | |
| 6,570,952 B2 | 5/2003 | Paladini | |
| 6,821,473 B2 | 11/2004 | Hiizumi et al. | |
| 7,006,887 B2 | 2/2006 | Nagano et al. | |
| 7,048,528 B2 | 5/2006 | Ishikawa et al. | |
| 7,158,849 B2 | 1/2007 | Huang et al. | |
| 7,460,159 B2 | 12/2008 | Ohkawara et al. | |
| 7,759,230 B2 | 7/2010 | Im | |
| 7,906,414 B2 | 3/2011 | Im | |
| 8,905,739 B2 | 12/2014 | Vermeeer et al. | |
| 2002/0011693 A1 | 1/2002 | Leyden et al. | |
| 2002/0084038 A1 | 7/2002 | Hiizumi et al. | |
| 2002/0153640 A1 | 10/2002 | John | |
| 2003/0052105 A1 | 3/2003 | Nangano et al. | |
| 2004/0036974 A1 | 2/2004 | Iizuka et al. | |
| 2004/0118309 A1 | 6/2004 | Fedor et al. | |
| 2005/0023719 A1 * | 2/2005 | Nielsen | B29C 67/0059 |
| | | | 264/162 |
| 2005/0208168 A1 | 9/2005 | Hickerson et al. | |
| 2008/0259228 A1 | 10/2008 | Henningsen | |
| 2009/0020901 A1 | 1/2009 | Schillen et al. | |
| 2009/0091732 A1 | 4/2009 | Kato | |
| 2010/0097662 A1 | 4/2010 | Churilla et al. | |
| 2010/0232835 A1 | 9/2010 | Ku | |
| 2010/0262272 A1 | 10/2010 | Shkolnik et al. | |
| 2010/0283188 A1 | 11/2010 | Rohner et al. | |
| 2011/0009992 A1 | 1/2011 | Shkolnik et al. | |
| 2012/0165969 A1 | 6/2012 | Elsey | |
| 2013/0001834 A1 | 1/2013 | Siblani et al. | |
| 2014/0052288 A1 * | 2/2014 | El-Siblani | G05B 19/042 |
| | | | 700/119 |

FOREIGN PATENT DOCUMENTS

| | | |
|---|---|---|
| EP | 0790119 B1 | 5/2003 |
| EP | 1674243 A2 | 6/2006 |
| EP | 1876012 A1 | 1/2008 |
| EP | 1995623 A2 | 11/2008 |
| EP | 2011631 B1 | 4/2012 |
| JP | 08150662 | 6/1996 |
| WO | 9806560 A | 2/1998 |
| WO | 2011064725 A1 | 6/2011 |
| WO | 2012021940 A1 | 2/2012 |

OTHER PUBLICATIONS

Yamazawa, Kenji, et al., "High Speed UV Laser Beam Scanning by Polygon Mirror," pp. 223-230, The Institute of Physical and Chemical Research (Riken), (1997).

Opposition to EP 2 011 631, dated Jan. 14, 2013.
European Patent Office (EPO) Notice of Opposition, dated Feb. 25, 2013.
Huang, et al., "Computer Supported Force Analysis and Layer Imagine for Masked Rapid Prototyping System" Department of Mechanical Engineering, National Taiwan University of Science and technology, Taipei, Taiwan.
Huang, et al., "On-line force monitoring of platform ascending rapid prototyping system" Journal of Materials Processing Technology 159 (2005) 257-264.
English translation of JP 08150662 Patent Abstracts of Japan from: http://www19.ipdl.inpit.go.jp/PA1/result/main/woYeaMaDA408150662P1.htm Jul. 15, 2011.
English translation of DE 10256672 from Lexis Nexis Total Patent.
English translation of DE 19929199 from Lexis Nexis Total Patent.
Non-Final Office Action for U.S. Appl. No. 14/329,153 dated Sep. 3, 2014.
Non-Final Office Action for U.S. Appl. No. 14/328,955 dated Sep. 3, 2014.
"Photodiode", Wikipedia, Feb. 10, 2010, accessed at http://web.archive.org/web/20100210073314/http://en.wikipedia.org/wiki/Photodiode on Sep. 17, 2014.
Extended European Search Report for EP App. No. 12804540.8 (PCT/US2012/044398) dated Jan. 22, 2015.
International Search Report and Written Opinion for PCT/US2014/066120 dated Feb. 13, 2015.
Paschotta; Rudiger, "Beam Divergence", Encyclopedia of Laser Physics and Technology, Jun. 2008, accessed at http://web.archive.org/web/20090131224642/http://www.rp-photonics.com/beam_divergence.html on Aug. 27, 2014.
Non-Final Office Action for U.S. Appl. No. 14/534,638 dated Sep. 3, 2014.
"Neutral Density Filter", Wikipedia, Dec. 15, 2010, accessed at http://en.wikipedia.org/wiki/index.%20php%20?title=%20Neutral_%20density_filter&oldid=402599066 on Aug. 28, 2014.
Notice of Allowance for U.S. Appl. No. 13/534,638 dated Apr. 14, 2015.
Notice of Allowance for U.S. Appl. No. 13/774,355 dated Apr. 23, 2015.
Notice of Allowance for U.S. Appl. No. 14/328,886 dated Apr. 15, 2015.
Notice of Allowance for U.S. Appl. No. 14/328,955 dated Apr. 23, 2015.
Notice of Allowance for U.S. Appl. No. 14/329,153 dated Apr. 27, 2015.
"Evolution, Q-Switched, Nd: YLF Green Pump Lasers" Coherent catalogue, Copyright 2012, WWW.Coherent.com.
"Laser Diodes" RP Photonics Encyclopedia, http://www.rp-photonics.com/laser_diodes.html.
Non-Final Office Action for U.S. Appl. No. 14/328,886 dated Sep. 3, 2014.
Digital Light Processing, http://en.wikipedia.org/wiki/Digital%20Light%20Processing?oldid=651882167.
International Search Report and Written Opinion for PCT/US2016/026112 dated Jul. 7, 2016.

* cited by examiner

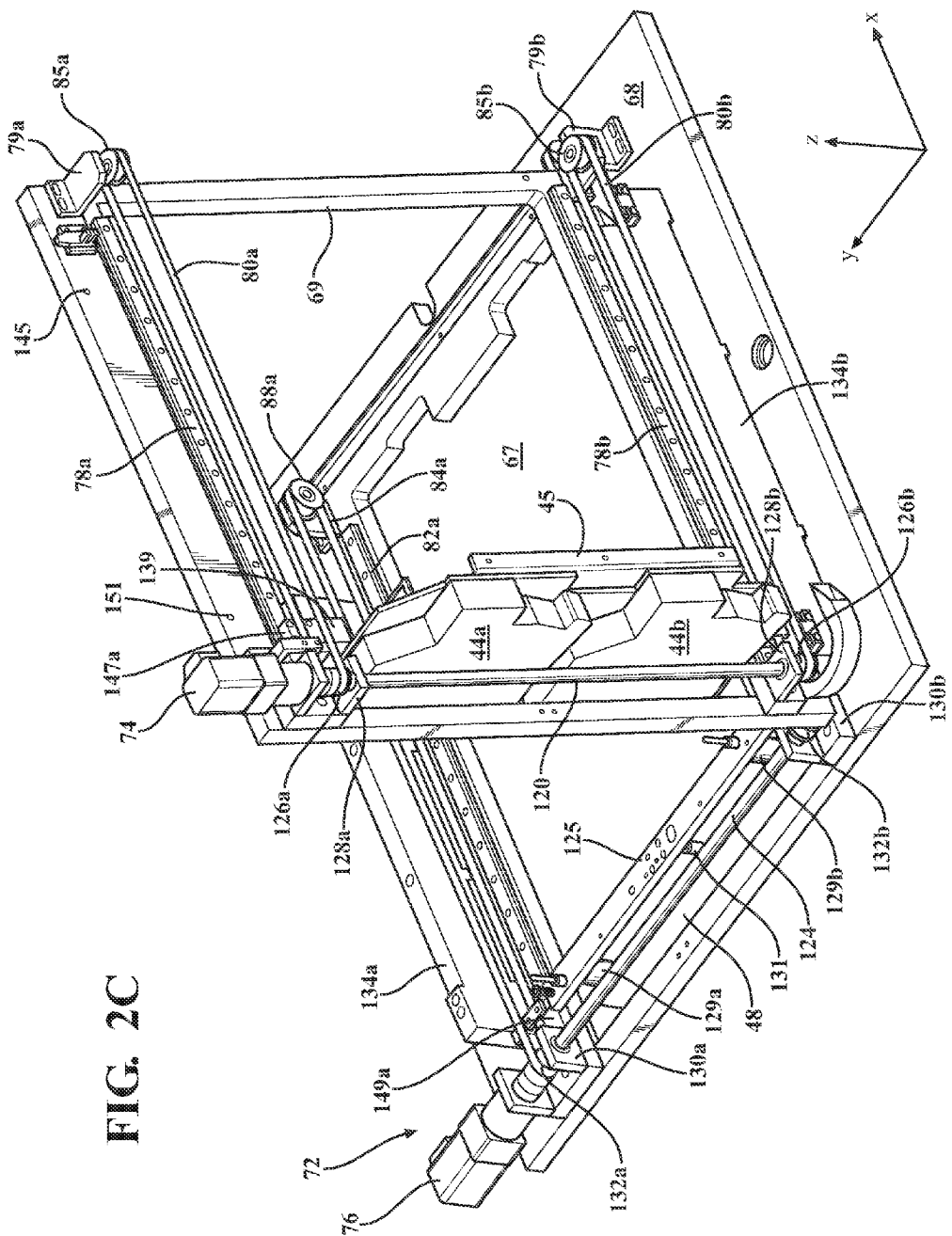

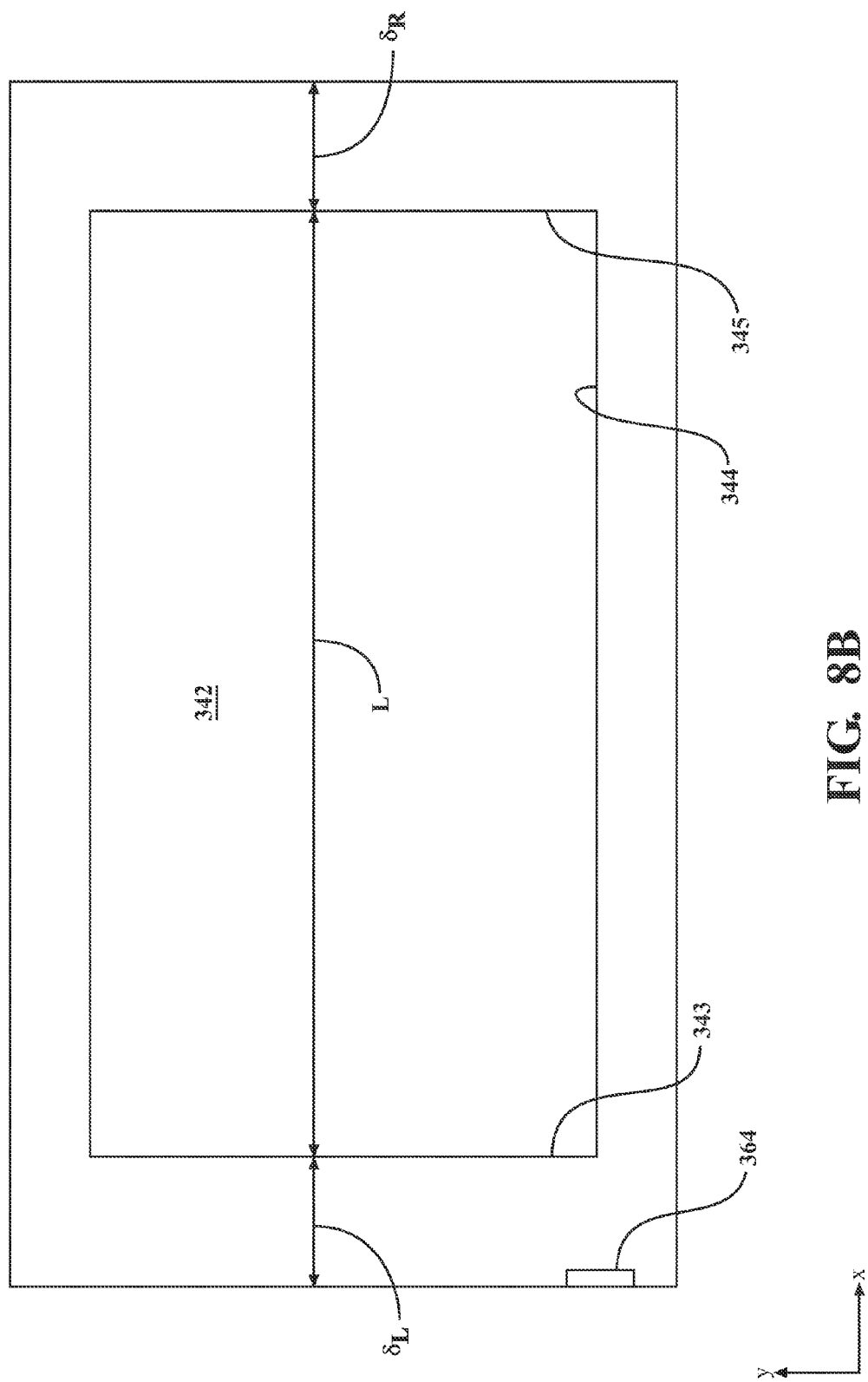

| m (computer memory index) | n (string index) | Data String |
|---|---|---|
| 0 | 20 | FFFFFFFF, 20, 22000, 44000 |
| 1 | 21 | FFFFFFFF, 21, 20000, 46000 |
| 2 | 22 | FFFFFFFF, 22, 18000, 484000 |
| ... | ... | ... |
| 6 | 26 | FFFFFFFF, 26, 0, 66000 |
| ... | ... | ... |
| 10 | 30 | FFFFFFFF, 30, 18000, 48000 |
| 11 | 31 | FFFFFFFF, 31, 20000, 46000 |
| 12 | 32 | FFFFFFFF, 32, 22000, 44000 |

| m | n (even) (L-R) | Data String |
|---|---|---|
| 0 | 20 | FFFFFFFF, 10, 8500, 54000 |
| 1 | 21 | FFFFFFFF, 11, 8250, 57750 |
| ... | ... | ... |
| 10 | 30 | FFFFFFFF, 30, 8250, 24750, 41250, 57750 |
| ... | ... | ... |
| 39 | 59 | FFFFFFFF, 59, 8250, 24750, 41250, 57750 |
| 40 | 60 | FFFFFFFF, 60, 8250, 24500, 41500, 57500 |

FIG. 8F

| m | n (odd) R-L | $(N_{max}-1)$ -n(odd) | Even layer data string for n(even) = $(N_{max}-1)$-n(odd) |
|---|---|---|---|
| 0 | 40 | 100-40 = 60 | FFFFFFFF, 40, 8500, 24500, 41500, 57500 |
| 1 | 41 | 100-41 = 59 | FFFFFFFF, 41, 8250, 24750, 41250, 57750 |
| ... | ... | ... | ... |
| 30 | 70 | 100-70 = 30 | FFFFFFFF, 42, 8250, 24750, 41250, 57750 |
| ... | ... | ... | ... |
| 39 | 79 | 100-79 = 21 | FFFFFFFF, 43, 8250, 57750 |
| 40 | 80 | 100-80 = 20 | FFFFFFFF, 44, 8500, 54000 |

FIG. 8G

APPARATUS AND METHOD FOR FORMING THREE-DIMENSIONAL OBJECTS USING LINEAR SOLIDIFICATION AND A VACUUM BLADE

FIELD

The disclosure relates to an apparatus and method for manufacturing three-dimensional objects, and more specifically, to an apparatus and method for using linear solidification and a vacuum blade to form such objects.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system.

Linear solidification devices have been proposed for use in manufacturing three-dimensional objects, and examples of such devices are disclosed in U.S. patent application Ser. Nos. 13/774,355 and 13/534,638, filed on Jun. 27, 2013 and Feb. 22, 2013, respectively, and in U.S. Provisional Patent Application Nos. 61/598,666 and 61/502,020, filed on Feb. 14, 2012 and Jun. 28, 2011, respectively. Each of the foregoing applications is hereby incorporated by reference in their entirety.

When using linear solidification devices, it is typically important to ensure that the exposed surface of the solidifiable material (e.g., photocurable liquid or resin) is planar to avoid inaccuracies in the resulting three-dimensional objects. For smaller build envelopes, rigid or semi-rigid solidification substrates (e.g., glass or hard plastic) may be used alone or in conjunction with films to provide the necessary degree of planarity. However, for larger build envelopes exceeding about 10 inches by 15 inches (150 in.$^2$) this approach may not be successful.

The use of vacuum blades to provide the requisite degree of planarity is also described in U.S. patent application Ser. No. 13/774,355. However, the blades described therein are fixed in space relative to a linear solidification device and are not configured for movement along the travel axis relative to the linear solidification device. When the linear solidification device moves in a first direction along a travel axis, the blade leads the linear solidification device. When the linear solidification device moves in a second direction along the travel axis, the blade trails the linear solidification device. This approach has limited such devices to the use of one-directional solidification. In some cases, it has also been found that the relatively close spacing between the vacuum blade and the linear solidification device when they are fixed in space relative to one another causes disturbances in the solidifiable material which yield inaccurate parts. Thus, a need has arisen for an apparatus and method for making three-dimensional objects using a linear solidification device and a vacuum blade which addresses the foregoing issues.

BRIEF DESCRIPTION OF THE DRAWINGS

The disclosure will now be described, by way of example, with reference to the accompanying drawings, in which:

FIG. 2C is a first perspective view of the solidification assembly of FIG. 2A with the laser table in an open configuration;

FIG. 8B is a top plan view of a source of solidifiable material comprising a build envelope and lateral offset regions;

FIG. 8F is a table depicting exemplary sets of data strings corresponding to an even layer of a three-dimensional object represented by the cross-sectional strip data of FIG. 8E;

FIG. 8G is a table depicting exemplary sets of data strings corresponding to an odd layer of a three-dimensional object represented by the cross-sectional strip data of FIG. 8E;

Like numerals refer to like parts in the drawings.

DETAILED DESCRIPTION

Figure 1:
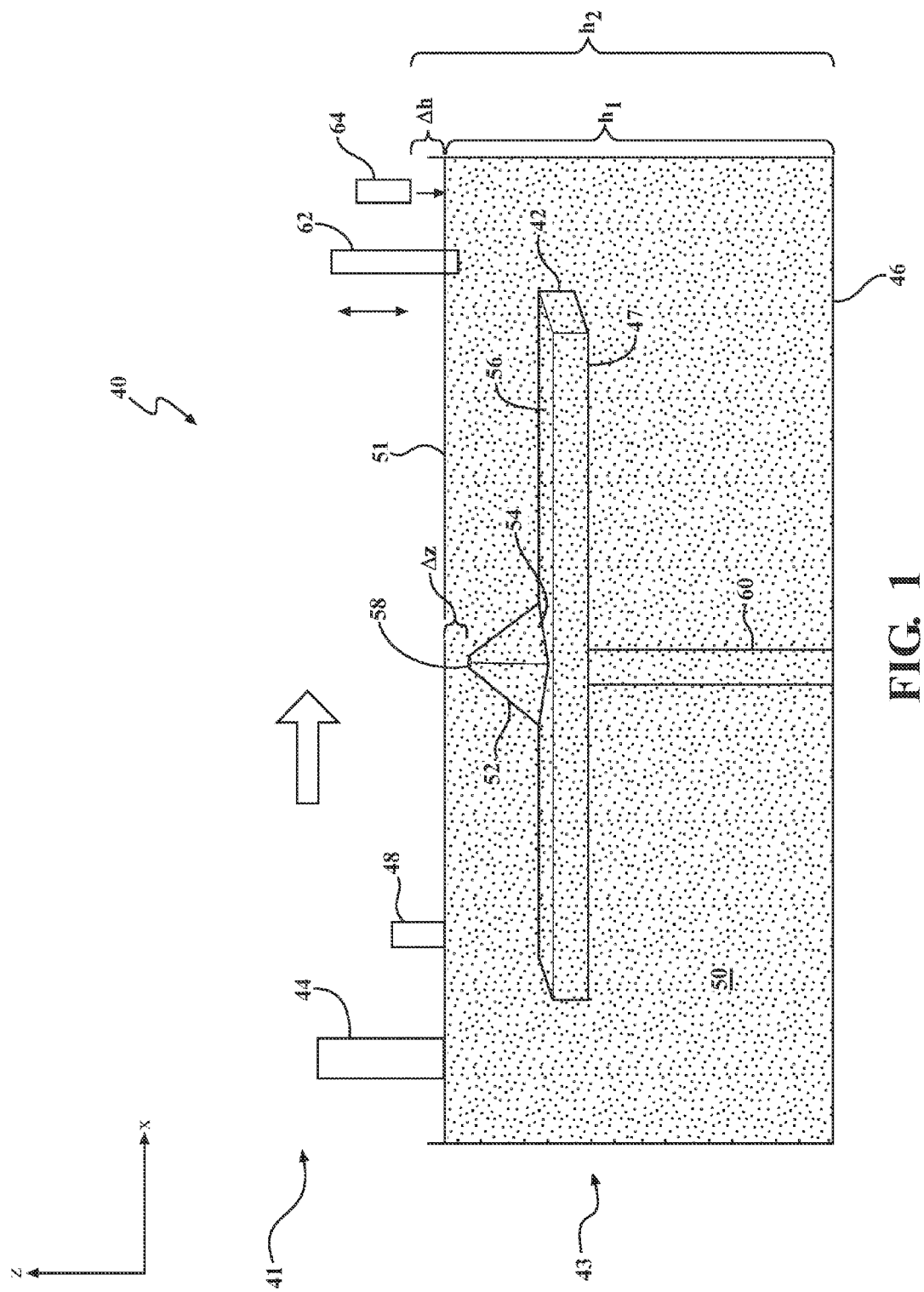
FIG. 1 is a side elevation view of a system for making at three-dimensional object using a linear solidification device and a vacuum blade.

The Figures illustrate examples of an apparatus and method for manufacturing a three-dimensional object from a solidifiable material. Based on the foregoing, it is to be generally understood that the nomenclature used herein is simply for convenience and the terms used to describe the invention should be given the broadest meaning by one of ordinary skill in the art.

The apparatuses and methods described herein are generally applicable to additive manufacturing of three-dimensional objects, such as components or parts (discussed herein generally as objects), but may be used beyond that scope for alternative applications. The system and methods generally include a linear solidification device that applies solidification energy to a solidifiable material, such as a photohardenable liquid or resin. The linear solidification devices apply solidification energy in a generally—and preferably substantially—linear pattern across an exposed surface of the solidifiable material and also move in a direction other than the one defined by the length of the linear pattern while applying solidification energy. In certain examples, the linear solidification device includes a scanning device that deflects received solidification energy in a scanning pattern. Such scanning devices include without limitation rotating polygonal mirrors and laser scanning micromirrors.

The apparatuses and methods described herein include a vacuum blade which is an elongated member with a cavity that is maintained at a sub-atmospheric pressure and which faces the exposed surface of the solidifiable material. In certain examples, the vacuum blade is traversed across the solidifiable material so that its lower-most surface is spaced apart from an exposed surface of the solidifiable material. However, owing to the sub-atmospheric pressure in the blade cavity, a meniscus is formed and the solidifiable material is drawn into the blade cavity. When the three-dimensional object is moved away from the exposed surface to create a new object layer, a region above the most recently formed, exposed object surface is depleted of solidifiable material (and hence, not planar with the exposed surface). As a result, material from the meniscus region and/or interior of the blade cavity is deposited to fill the depleted region and create a substantially planar exposed solidifiable material surface across the build envelope. The blade may traverse across the solidifiable material along either the travel axis or the scanning axis of the linear solidification device. However, it is preferable that the blade move across the solidifiable material in opposite directions in each successive pass prior to solidification so that the dispensing of material occurs bi-directionally. It has been found that dispensing material uni-directionally causes disturbances in the volume of solidifiable material which yield inaccurate three-dimensional objects.

As discussed herein, a solidifiable material is a material that when subjected to energy, wholly or partially hardens. This reaction to solidification or partial solidification may be used as the basis for constructing the three-dimensional object. Examples of a solidifiable material may include a polymerizable or cross-linkable material (resin and/or liquid), a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material my take on a final form (e.g., after exposure to the electromagnetic radiation) that may vary from semi-solids, solids, waxes, and crystalline solids. In one embodiment of a photopolymer paste solidifiable material, a viscosity of between 10000 cP (centipoises) and 150000 cp is preferred.

When discussing a photopolymerizable, photocurable, or solidifiable material, any material is meant, possibly comprising a liquid resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth)acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1,2 di-ketones, acyl-phosphine oxides, benzyldimethyl-ketals, α-amino ketones, and α-hydroxy ketones. Examples of suitable metallocenes include Bis (eta 5-2, 4-cyclopenadien-1-yl) Bis [2,6-difluoro-3-(1H-pyrrol-1-yl) phenyl]titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl) phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

The linear solidification device may be configured in a number of ways. In certain examples, the linear solidification device progressively exposes portions of the solidifiable material to solidification energy along one axis (a scanning axis) as the device moves along another axis. In other examples, a generally, or preferably substantially, linear pattern of solidification energy is applied in a single exposure along one axis as the device moves along another axis. The solidification energy may comprise electromagnetic radiation. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application.

Referring to FIG. 1, a system 40 for making a three-dimensional object is depicted. System 40 includes a solidification assembly 41 and a solidifiable material assembly 43. Solidifiable material assembly 43 comprises a solidifiable material container 46 in which a volume of solidifiable material 50 is provided. A build platform 42 is provided and includes an upper surface 56 on which three-dimensional object 52 is progressively built along a build (z) axis. Build platform 42 also includes a lower surface 47 that faces away from upper surface 56 and object 52. A movable shaft 60 is provided and is operatively connected to an elevator assembly (not shown) which includes a motor (not shown) for selectively moving the build platform 42 along the build (z) axis.

Linear solidification device 44 progressively applies solidification energy to exposed surface 51 of solidifiable material 50 along a scanning (y) axis as it moves along a travel (x) axis. In preferred embodiments, linear solidification device 44 includes a linear scanning device, and solidification energy is "scanned" in a scanning direction that defines a scanning axis (i.e., the y-axis) as the linear solidification device 44 moves in the x-direction. Preferably, the linear solidification device 44 is not itself moved along the scanning (y) axis as this occurs. The sequential linear scans along the scanning (y) axis direction may be referred to as "linear scanning operations" herein.

Figure 5B:
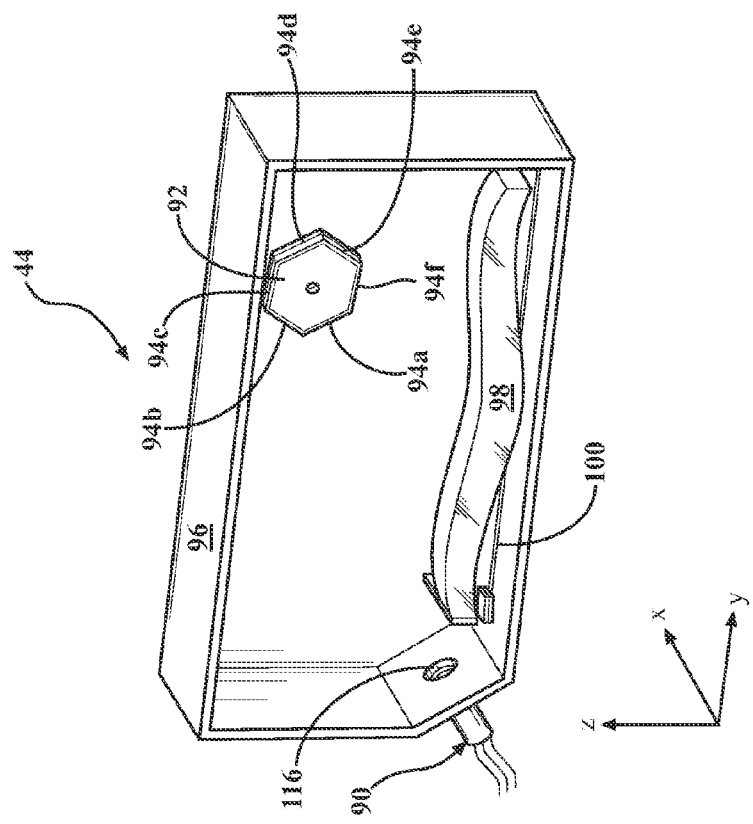
FIG. 5B is a perspective view of the front of the linear solidification device of FIG. 5B.
Figure 5A:
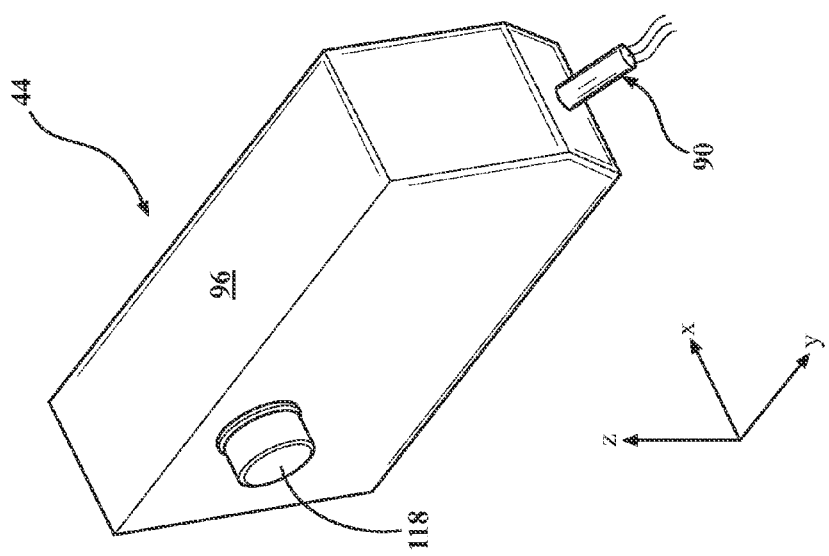
FIG. 5A is a perspective view of the rear of a linear solidification device comprising a solidification energy source and a rotating energy deflector.
Figure 5C:
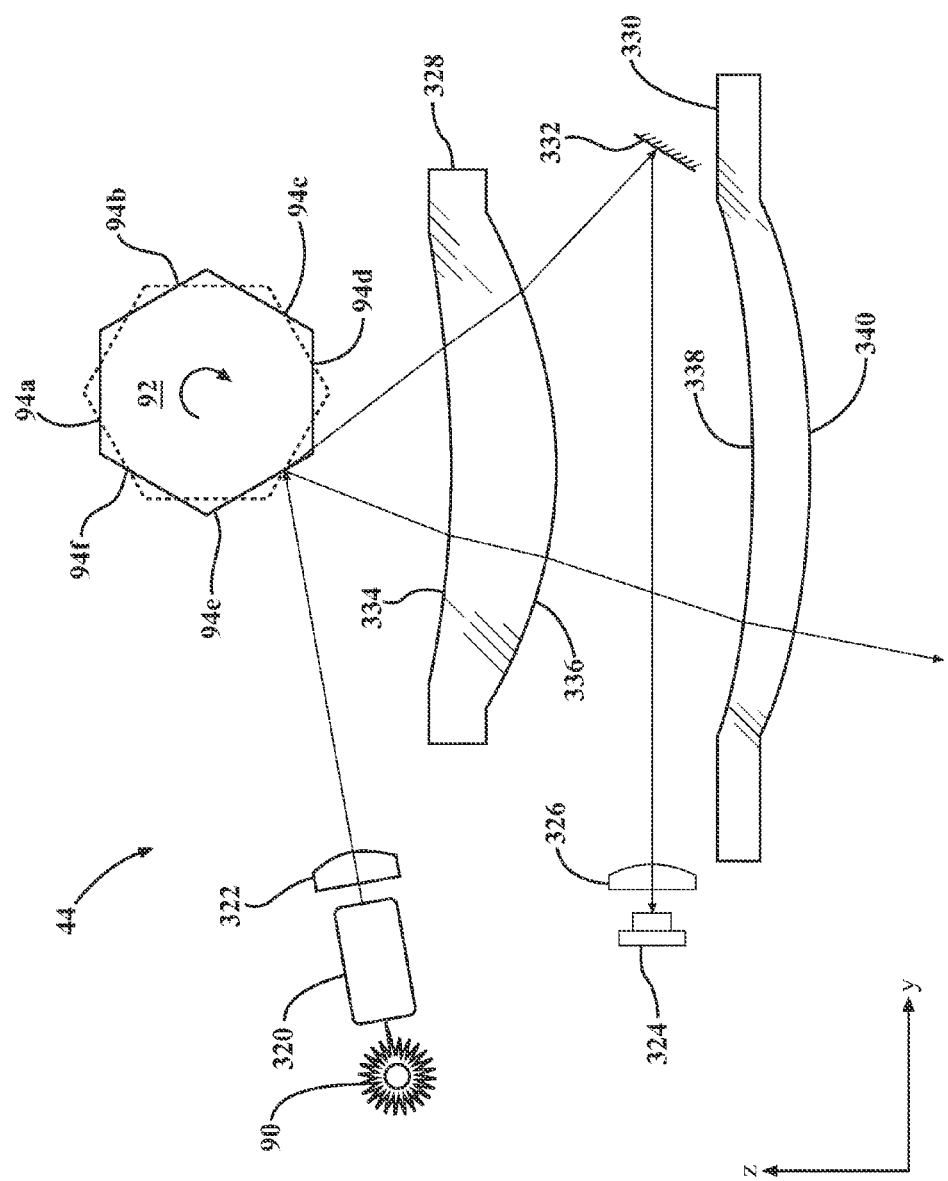
FIG. 5C is a schematic view of a first alternate version of the linear solidification device of FIG. 5A in which the housing is removed and which includes a solidification energy synchronization sensor.

Referring to FIGS. 5A-5C, linear solidification device 44 comprises a solidification energy source 90, a scanning device, and a housing 96. In the embodiment depicted in FIGS. 5A-5C, the scanning device is a rotating energy deflector 92. In other examples of a linear solidification device 44, the scanning device is a laser scanning micromirror that is used in place of rotating energy deflector 92. Thus, it should be understood throughout that a laser scanning micromirror may be used in place of a rotating energy deflector 92 in the exemplary embodiments described herein.

Suitable laser scanning micromirrors include magnetically-actuated MOEMS (micro-opto-electromechanical systems) micromirrors supplied under the name LSCAN by Lemoptix SA of Switzerland. A laser scanning micromirror comprises a silicon chip with a fixed part and a movable mirror part. The mirror is electrically or magnetically actuated to tilt relative to the fixed part to a degree that corresponds to the actuating signal. As the mirror tilts, received solidification energy is scanned via deflection from the tilting mirror. Thus, the degree of tilt or tilt angle corresponds to the position along the scanning (y) axis at which the deflected solidification energy strikes the surface 51 of the solidifiable material 501.

In certain preferred examples, and as shown in FIG. 5B, a lens 98 is provided between the rotating energy deflector 92 and a bottom surface of housing 96 to focus deflected solidification energy and transmit it toward the solidifiable material. In the example of FIG. 5B, the solidifiable material 50 is underneath and in contact with blade 48. In the example of FIG. 5B, lens 98 is preferably a flat field lens. In certain examples, the lens 98 is a flat field lens that is transparent to violet and ultraviolet radiation. In additional examples, the lens 98 also has a focal distance that is longer on the ends of the lens relative to the middle (referring to the y-axis scanning direction along which the lens length is oriented) to compensate for different solidification energy beam travel distances from the rotating energy deflector 92 to the solidifiable material. In certain implementations, lens 98 includes an anti-reflective coating such that the coated lens transmits at least 90%, preferably at least 92%, and more preferably at least 95% of the incident light having a wavelength ranging from about 380 nm to about 420 nm. In one example, lens 98 transmits at least about 95% of the incident light having a wavelength of about 405 nm. Suitable coatings include single layer, magnesium difluoride ($MgF_2$) coatings, including ARSL0001 MgF2 coatings supplied by Siltint Industries of the United Kingdom. Housing 96 includes a linear opening 100 through which transmitted solidification energy is projected to exposed surface 51 of solidifiable material 50.

Figure 3A:
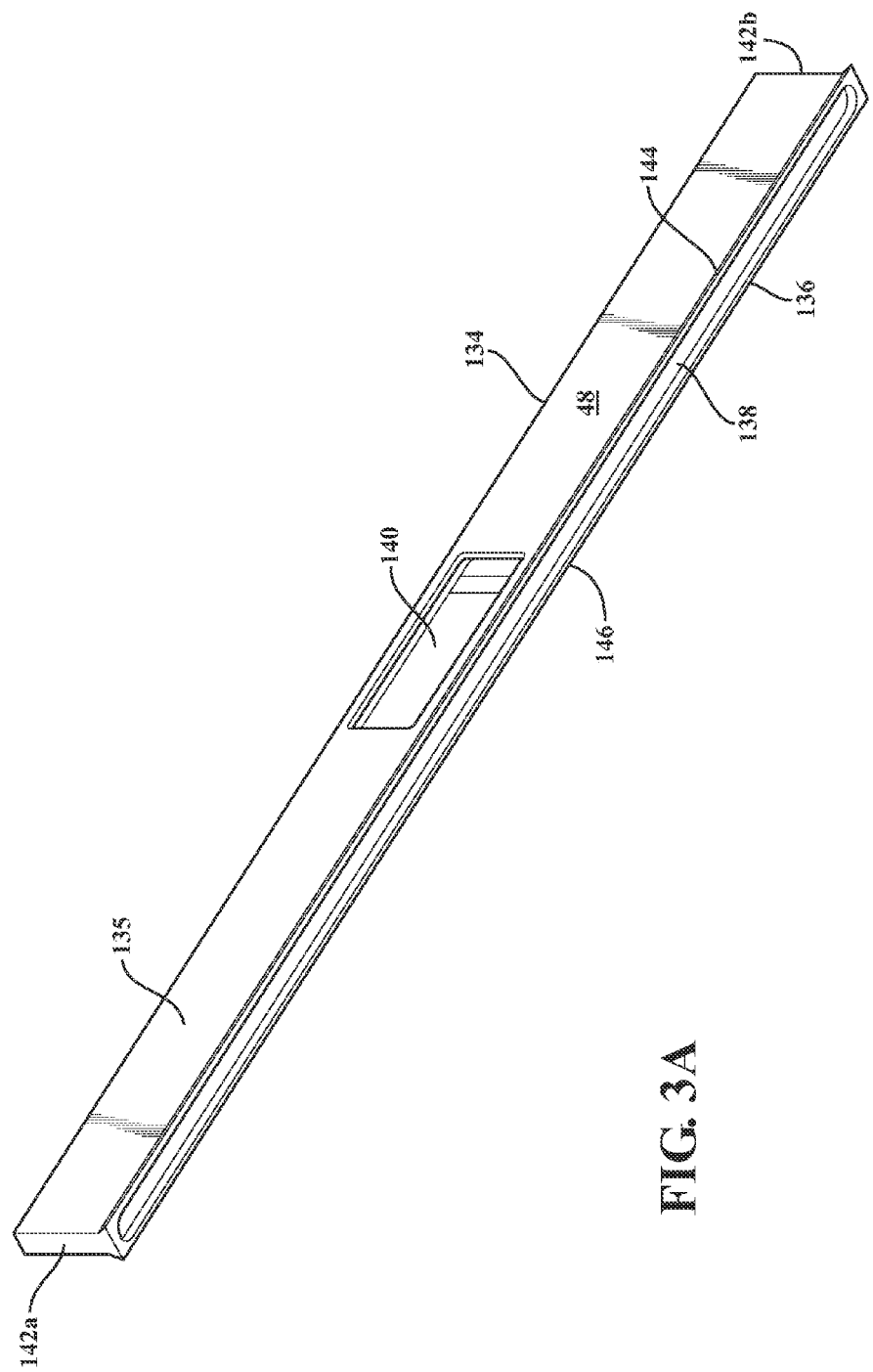
FIG. 3A is a perspective view of the vacuum blade of FIGS. 2A-2C.
Figure 3B:
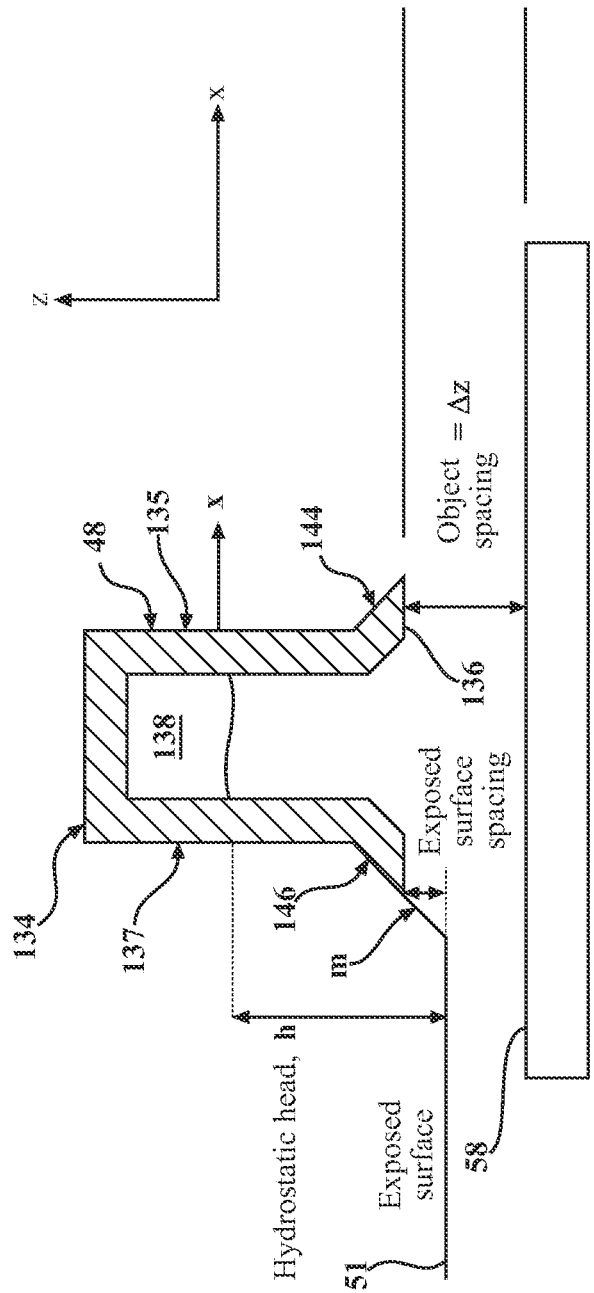
FIG. 3B is a cross-sectional view of the vacuum blade of FIGS. 2A-2C depicting a meniscus created as the vacuum blade traverses along a travel axis.

As linear solidification device 44 traverses in a first direction along the travel (x) axis, it selectively projects solidification energy onto the exposed surface 51 of the solidifiable material 50 along the scanning (y) axis in a pattern that is dictated by object data representative of the three-dimensional object 52. A bottom most surface 54 (which may comprise removable supports) of object 52 is adhered to the upward facing surface 56 of build platform 42. The exposed surface 58 of the most-recently formed object layer is spaced apart from the exposed surface 51 of the solidifiable material 50. Following the solidification of a layer of solidifiable material, the build platform 42 descends in the negative direction along the build (z) axis by an amount equal to the thickness of the next object layer $\Delta z$. In many cases, owing to the viscosity of solidifiable material 50, the region above the exposed object surface 58 along the build (z) axis may be partially deleted of solidifiable material 50, such that it is not level with the exposed surface 51 of solidifiable material. Vacuum blade 48 holds a volume of solidifiable material 50 in its interior cavity 138 (FIGS. 3A-3B). As the vacuum blade 48 traverses the depleted region above exposed object surface 58, it deposits solidifiable material 50 so that the region is co-planar with exposed surface 51 of solidifiable material 50. In FIG. 1, vacuum blade 48 travels along the travel axis of linear solidification device 44. However, vacuum blade 48 may be configured to travel along the scanning axis of linear solidification device 44.

A detailed depiction of vacuum blade 48 is provided in FIGS. 3A-3B. Vacuum blade 48 is a generally rigid rectangular member formed from a suitable metal. Referring to FIGS. 3A-3B, vacuum blade 48 includes first and second surfaces 135 and 137 having lengths that extend along the scanning (y) axis direction and which are spaced apart from one another along the travel (x) axis direction. Surfaces 135 and 137 lie in the y-z plane. Upper surface 134 lies in the x-y plane and connects first and second surfaces 135 and 137. The spacing between surfaces 135 and 137 creates a hollow interior or cavity 138 that may receive a volume of solidifiable material 50. First and second surfaces 135 and 137 are connected to respective projecting edges 144 and 146. Projecting edge 144 is connected to first surface 135 and projects away from both first surface 135 and second surface 137 along a direction that has both x-axis and z-axis components. Projecting edge 146 is connected to second surface 137 and projects away from both first surface 135 and second surface 137 along a direction that has both x-axis and z-axis components. The projecting edges 144 and 146 are spaced apart from one another along the x-axis and face away from one another along the x-axis. The projecting edges 144 and 146 are also spaced apart from upper surface 134 in a direction along the z-axis.

The hollow interior or cavity 138 of vacuum blade 48 is preferably in fluid communication with a vacuum pump or a compressor that is operable to maintain the hollow interior 138 at a pressure that is below atmospheric pressure (which is typically 14.7 psia at sea level). The maintenance of a subatmospheric pressure causes a level (shown as having a height h in FIG. 3B) of solidifiable material 50 to develop within the hollow interior 138 of vacuum blade 48 relative to the exposed surface 51 of the solidifiable material 50 which remains at atmospheric pressure. The level of solidifiable material 50 within cavity 138 may be determined by well known calculations that relate the level of vacuum to the hydrostatic head h created by the level in the vacuum blade interior 138. A pressure regulator is preferably provided to maintain a desired level of vacuum within hollow interior 138. A shown in FIG. 3B, a meniscus m is created between the projecting edges 146 and 144 and the exposed surface 51 of the solidifiable material 50. The meniscus m seals the bottom surface 136 of vacuum blade 48. In certain examples, the bottom surface 136 of the blade 48 is spaced apart from the exposed surface 51 of solidifiable material 50 by an amount that is greater than zero, preferably greater than 0.002 inches (0.051 mm), more preferably greater than 0.004 inches (0.102 mm), and still more preferably greater than about 0.006 inches (0.152 mm). At the same time, the bottom surface 136 of the blade 48 is spaced apart from the exposed surface 51 of solidifiable material 50 by an amount that is no more than about 0.12 inches (0.305 mm), more preferably no more than about 0.010 inches (0.254 mm), and still more preferably no more than about 0.008 inches (0.203 mm).

Referring to FIGS. 5A and 5B, housing 96 is a generally polygonal structure. As depicted in the figures, housing 96 has an open face, but the face may be closed. Rotating energy deflector 92 is spaced apart from solidification energy source 90 in both the height (z-axis) and width (y-axis) direction, and may be slightly offset from solidification energy source 90 in the length (x-axis) direction as well. Rotating energy deflector 92 is rotatably mounted to housing 96 so as to rotate substantially within a plane that may preferably be oriented substantially perpendicularly to the length (x-axis) direction (i.e., the y-z plane). Solidification energy source port 116 is provided for mounting solidification energy source (e.g., a laser diode) such that it is in optical communication with at least one facet 94a-94f of rotating energy deflector 92 at one time. As indicated previously, lens 98 is spaced apart and below from rotating energy deflector 92 in the height (z-axis) direction and is located above housing light opening 100.

Motor 118 is mounted on a rear surface of housing 96 and is operatively connected to rotating energy deflector 92. Motor 118 is connected to a source of power (not shown). When motor 118 is energized, rotating energy deflector 92 rotates in the y-z plane, bringing the various facets 94a-94f sequentially into optical communication with solidification energy source 90. A control unit (FIG. 4) may also be provided to selectively energize motor 118. Motor 118 may be a stepper or servo motor. In certain examples, motor 118 is driven by continuous energy pulses. In the case of motor 118, in certain preferred embodiments, it is driven by continuous energy pulses such that the timing of each pulse corresponds to a fixed rotational position of a facet 94a-f of rotating energy deflector 92. As the motor is pulsed, each of the facets 94a-f will sequentially come into optical communication with solidification energy source 90, and the particular facet that is in optical communication with solidification energy source 90 will have a fixed rotational position that corresponds to the timing of the pulse.

In certain implementations, the rotational position of rotating energy deflector 92 may repeatably correspond to the timing of each motor energy pulse without being known by the operator. The fixed association of the motor energy pulse and the rotational position of the facets 94a-94f allows the motor pulse timing to be used to synchronize the transmission of a synchronization solidification energy signal from solidification energy source 90 so that a synchronization solidification energy signal is issued for each facet 94a-f at some defined rotational position while it is in optical communication with solidification energy source 90.

In certain implementations, it is desirable to provide a scanning (y) axis scanning speed (i.e., a speed at which solidification energy moves along the exposed surface of the solidifiable material) that is significantly greater than the travel (x) axis speed at which the linear solidification device 44 moves. Providing this disparity in y-axis and x-axis speeds helps to better ensure that the scanned energy pattern is linear and orthogonal to the x-axis direction, thereby reducing the likelihood of object distortion. In certain examples, the scanning speed in the y-axis direction is at least about 1000 times, preferably at least about 1500 times, more preferably at least about 2000 times, and still more preferably at least about 2200 times the speed of movement of linear solidification device 44 in the x-axis direction. In one example, linear solidification device 44 moves at a speed of about 1 inch/second in the x-axis direction and the y-axis scanning speed is about 2400 inches/second. Increasing the scanning speed relative to the speed of movement of linear solidification device 44 in the x-axis direction increases the resolution of the scanning process by increasing the number of scan lines per unit of length in the x-axis direction.

The scanning speed (in number of scans per unit time) at which solidification energy is progressively applied to selected areas of a solidifiable resin along a scanning (y) axis corresponds to the rotational speed of rotating energy deflector 92 multiplied by the number of facets 94*a-f*. In certain examples, the rotational speed is from about 1,000 to about 10,000 rpm, preferably from about 2,000 to about 8,000 rpm, and more preferably from about 3,000 to about 5,000 rpm.

Referring to FIG. 5C, an alternate embodiment of linear solidification device 44 of FIGS. 5A and B is depicted. In FIG. 5C, housing 96 is removed. As shown in the figure, solidification energy source 90 is in optical communication with one facet 94(*a*)-(*f*) of rotating energy deflector 92 at any one time as rotating energy deflector 92 rotates in the y-z plane (i.e., the plane orthogonal to the direction of movement of linear solidification device 44). In this embodiment, one or more solidification energy focusing devices is provided between solidification energy source 90 and rotating energy deflector 92. In the example of FIG. 5C, the one or more focusing devices comprises a collimator 320 and a cylindrical lens 322.

Collimator 320 is provided between solidification energy source 90 and cylindrical lens 322. Cylindrical lens 322 is provided between collimator 320 and rotating energy deflector 92. Collimator 320 is also a focusing lens and creates a round shaped beam. Cylindrical lens 322 stretches the round-shaped beam into a more linear form to allow the beam to decrease the area of impact against rotating energy deflector 92 and more precisely fit the beam within the dimensions of one particular facet 94(*a*)-(*f*). Thus, solidification energy transmitted from solidification energy source 90 passes through collimator 320 first and cylindrical lens 322 second before reaching a particular facet 94(*a*)-(*f*) of rotating energy deflector 92.

In certain preferred examples, collimator 320 and/or cylindrical lens 322 transmit at least 90%, preferably at least 92%, and more preferably at least 95% of the incident light having a wavelength ranging from about 380 nm to about 420 nm. In one example, collimator 320 and cylindrical lens 322 transmit at least about 95% of the incident light having a wavelength of about 405 nm. In the same or other examples, solidification energy source 90 comprises a laser diode having a beam divergence of at least about five (5) milliradians, more preferably at least about six (6) milliradians, and sill more preferably at least about 6.5 milliradians. At the same time or in other examples, the beam divergence is no more than about nine (9) milliradians, preferably no more than about eight (8) milliradians, and still more preferably not more than about 7.5 milliradians. In one example, the divergence is about 7 milliradians. Collimator 320 is preferably configured with a focal length sufficient to collimate light having the foregoing beam divergence values. Collimator 320 is preferably configured to receive incident laser light having a "butterfly" shape and convert it into a round beam for transmission to cylindrical lens 322.

In certain examples, collimator 320 has an effective focal length that ranges from about 4.0 mm to about 4.1 mm, preferably from about 4.0 mm to about 4.5 mm, and more preferably from about 4.01 mm to about 4.03 mm. In one example, collimator 320 is a molded glass aspheric collimator lens having an effective focal length of about 4.02 mm. One such collimator 320 is a Geltech™ anti-reflective coated, molded glass aspheric collimator lens supplied as part number 671TME-405 by Thorlabs, Inc. of Newton, N.J. This collimator is formed from ECO-550 glass, has an effective focal length of 4.02 mm, and has a numerical aperture of 0.60.

In certain examples, collimator 320 and/or cylindrical lens 322 are optimized based on the specific wavelength and beam divergence characteristics of solidification energy source 90. In one example, collimator 320 and/or cylindrical lens 322 are formed from a borosilicate glass such as BK-7 optical glass. In certain preferred examples, collimator 320 and/or cylindrical lens 322 are coated with an anti-reflective coating such that the coated collimator 320 and coated cylindrical lens 322 transmit at least 90%, preferably at least 92%, and more preferably at least 95% of the incident light having a wavelength ranging from about 380 nm to about 420 nm. Suitable anti-reflective coatings include magnesium difluoride ($MgF_2$) coatings such as the ARSL0001 MgF2 coating supplied by Siltint Industries of the United Kingdom.

In certain examples of a linear solidification device 44, the solidification energy defines a spot (which may or may not be circular) at the point of impingement on the solidifiable material. The angle of incidence between the solidification energy and the solidifiable material will vary with the rotational position of a given facet 94(*a*)-(*f*) relative to the solidification energy source 90. The spot dimensions and shape will also tend to vary with the angle of incidence. In some cases, this variation in spot size and/or spot dimensions can produce uneven solidification patterns and degrade the accuracy of the object building process. Thus, in certain examples, one or more lenses are provided between rotating energy deflector 92 and the solidifiable material to increase the uniformity of the spot size and/or dimensions as the rotational position of rotating energy deflector 92 changes. In certain examples, the one or more lenses is a flat field lens 98 (FIGS. 5A and 5B). In other examples (FIG. 5C), the one or more lenses is an F-Theta lens (328 or 330). In other examples, and as also shown in FIG. 5C, the one or more lenses is a pair of F-Theta lenses 328 and 330. The F-Theta lenses 328 and 330 are spaced apart from one another and from the rotating energy deflector 92 along the z-axis direction (i.e., the axis that is perpendicular to the scanning direction and the direction of movement of the linear solidification device 44). First F-Theta lens 328 is positioned between second F-Theta lens 330 and rotating energy deflector 92. Second F-Theta lens 330 is positioned between first F-Theta lens 328 and the solidifiable material (as well as between first F-Theta lens 328 and light opening 100, not shown in FIGS. 5C-D).

First F-Theta lens 328 includes an incident face 334 and a transmissive face 336. Incident face 334 receives deflected solidification energy from rotating energy deflector 92. Transmissive face 336 transmits solidification energy from first F-Theta lens 328 to second F-Theta lens 330. Similarly, second F-Theta lens 330 includes incident face 338 and transmissive face 340. Incident face 338 receives solidification energy transmitted from transmissive face 336 of first F-Theta lens 338, and transmissive face 340 transmits solidification energy from second F-Theta lens 330 to housing light opening 100 (not shown in FIG. 5C) and to the solidifiable material.

In certain implementations of the linear solidification device of FIG. 5C, first F-Theta lens 328 has a refractive index that is less than that of second F-Theta lens 330. The relative difference in refractive indices helps reduce laser beam scattering losses. At the same time or in other implementations, the radius of curvature of first F-Theta lens transmissive face 336 is less than the radius of curvature of second F-Theta lens transmissive face 340. Suitable pairs of F-Theta lenses are commercially available and include F-Theta lenses supplied by Konica Minolta and HP. In certain embodiments, the F-Theta lenses 328 and 330 are preferably coated with an anti-reflective coating. The anti-reflective coating is used to maximize the amount of selected wavelengths of solidification energy that are transmitted through F-Theta lenses 328 and 330. In one example, the anti-reflective coating allows the coated F-Theta lenses 328 and 330 to transmit greater than 90 percent of the incident solidification energy having a wavelength between about 325 nm and 420 nm, preferably greater than 90 percent of the incident solidification energy having a wavelength between about 380 nm and about 420 nm, more preferably greater than about 92 percent of the incident solidification energy having a wavelength between about 380 nm and about 420 nm, and still more preferably greater than 95 percent of the incident solidification energy having a wavelength between about 380 nm and about 420 nm. In one specific example, the coated F-theta lenses transmit at least about 95% of the incident light having a wavelength of about 405 nm (i.e., blue laser light). In other preferred embodiments, collimator 320, and cylindrical lens 322 are also coated with the same anti-reflective coating. Suitable anti-reflective coatings include magnesium difluoride (MgF2) coatings such as the ARSL001 coating supplied by Siltint Industries of the United Kingdom.

In certain examples, linear solidification device 44 may comprise multiple solidification energy sources. In some implementations, the linear solidification device 44 may include multiple solidification energy sources that provide solidification energy of the same wavelength, and the device 44 may transmit a single beam of solidification energy to the solidifiable material. In other implementations, the device 44 may include solidification energy sources of different wavelengths and selectively transmit solidification energy of only one of the wavelengths to a solidifiable material. This implementation may be particularly useful when a three-dimensional object is built using multiple solidifiable materials each of which solidifies in response to solidification energy of different wavelengths (e.g., because their photoinitiators are activated by different wavelengths of solidification energy).

Figure 5D:
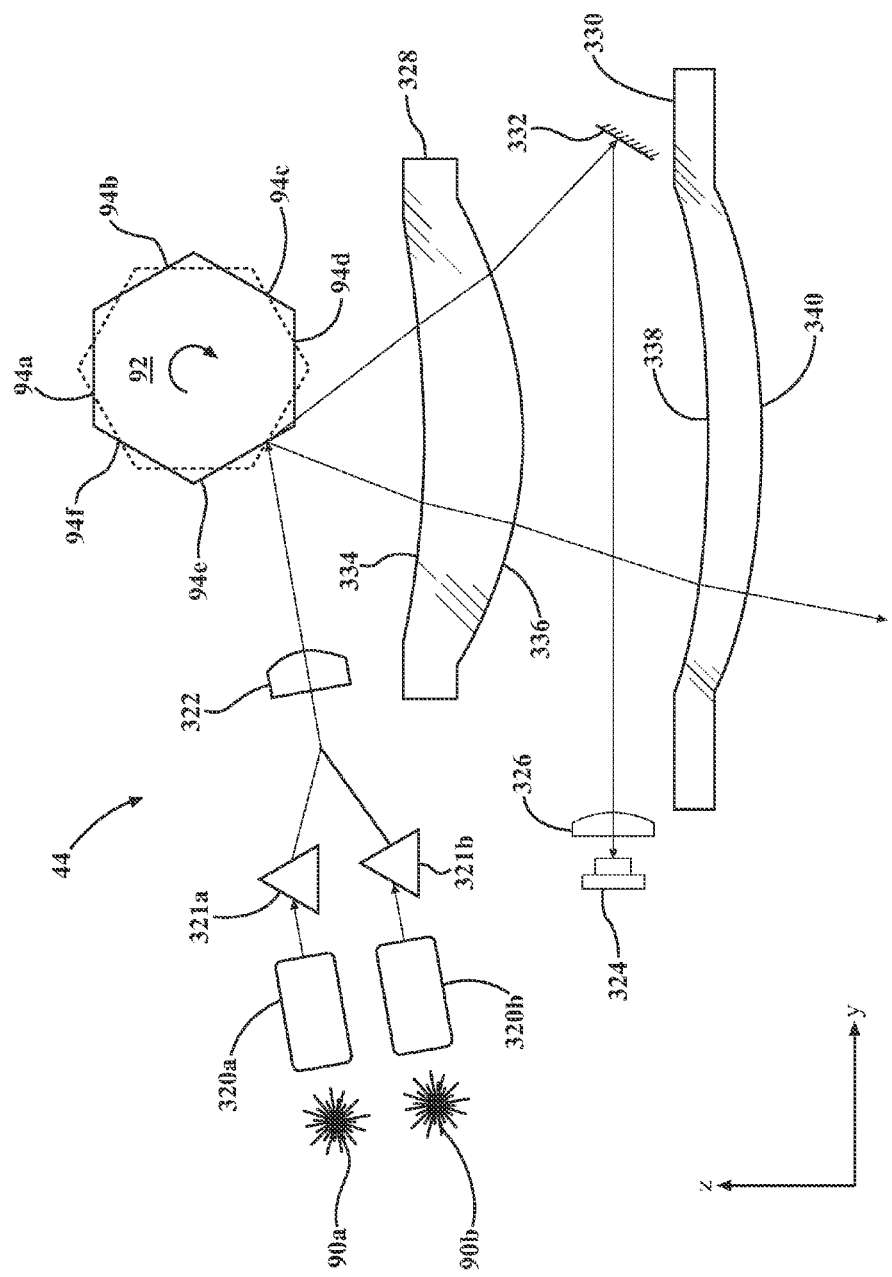
FIG. 5D is a schematic view of a second alternate version of the linear solidification device of FIG. 5A in which the housing is removed and which includes dual solidification energy sources and a solidification energy sensor.

Referring to FIG. 5D, an alternate version of linear solidification device 44 (with the housing removed) is depicted in schematic form. The linear solidification device 44 is the same as the one depicted in FIG. 5C with two exceptions. First, the linear solidification device 44 of FIG. 5D includes two solidification energy sources 90a and 90b. In the specific embodiment of FIG. 5D, solidification energy sources 90a and 90b transmit solidification energy of substantially the same wavelength. In some cases, the use of such multiple solidification energy sources 90a, 90b is desirable in order to increase the power of the solidification energy transmitted to the solidifiable material. The power of the solidification energy can affect the rate of solidification, which in turn may limit the maximum speed of travel of the linear solidification device 44 in the x-axis direction. In order to solidify, for example, a given volume of a solidifiable resin, the volume must receive sufficient solidification energy (e.g., in Joules). The solidification energy received by a given volume of solidifiable material is a function of the power (e.g., in Watts) of the solidification energy and the time of exposure of the volume of solidifiable material. As a result, as the power is reduced, the rate of travel of the linear solidification device 44 must be reduced to ensure that sufficient solidification energy is received at each location along the direction of travel (i.e., x-axis) of linear solidification device 44. Put differently, at a desired solidification depth in the build axis (z-axis) direction, increasing the power of the solidification energy increases the rate at which the linear solidification device 44 can be traversed in the x-axis direction, and hence, the speed of an object build process.

The second difference between the linear solidification devices 44 of FIGS. 5C and 5D is the inclusion of prisms 321a and 321b in FIG. 5D. The linear solidification device 44 of FIG. 5D is intended to combine solidification energy from both sources 90a and 90b into a single beam for delivery to the solidifiable material. The single beam preferably has a power that is at least 1.5 times, preferably at least 1.7 times, and more preferably at least 1.95 times the average power of the individual solidification energy sources 90a and 90b. Each solidification energy source 90a and 90b transmits its respective solidification energy to a respective prism 321a and 321b. The prisms 321a and 321b receive incident solidification energy at a first angle and deflect the energy to produce transmitted solidification energy beams at a second (different) angle that allows the individual beams to be combined in a single beam. It is believed that the individual beams combine ahead of cylindrical lens 322, after which the solidification energy is received by rotating energy deflector 92 and ultimately transmitted to the solidifiable material in the same manner described previously with respect to FIG. 5C.

As mentioned previously, the linear solidification device 44 of FIGS. 5C and 5D also includes a solidification energy sensor 324, which may be an optical sensor. Suitable optical sensors include photodiodes. One exemplary photodiode that may be used is a 404 nm, 500 mW photodiode supplied by Opnext under the part number HL40023MG.

Solidification energy sensor 324 generates a signal upon receipt of solidification energy. Mirror 332 is provided and is in optical communication with rotating energy deflector 92 such that when each facet of rotating energy deflector 92 receives solidification energy from solidification energy source 90 while at a particular rotational position (or range of positions) in the y-z plane, the energy will be deflected toward mirror 332 (as shown by the dashed lines). Similarly, when the scanning device used in linear solidification device 44 is a laser scanning micromirror, a particular tilt angle or range of tilt angles will cause received solidification energy to be deflected toward mirror 332. The solidification energy then reflects off of mirror 332 along a path that is substantially parallel to the scanning axis (y-axis) between first F-Theta lens 328 and second F-Theta lens 330 to sensor 324. Sensor 324 may be operatively connected to a computer to which it will transmit the signal generated upon receipt of solidification energy. The signal may be stored as data and/or used in programs associated with a solidification energy source controller (not shown). An example of a line scanning synchronization method that makes use of the generated sensor signal is described below.

In certain examples, sensor 324 is used to determine the beginning of a line scanning operation along the scanning (y) axis. However, in certain cases using the solidification energy sources described herein, the intensity of the solidification energy transmitted by solidification energy source 90 may be higher than desired, thereby reducing the sensitivity of sensor 324 due, at least in part, to the presence of scattered and ambient light. As a result, in some implementations a filter 326 is provided between sensor 324 and mirror 332 along the path of travel of solidification energy from mirror 332 to sensor 324. Filter 326 preferably reduces the intensity of electromagnetic radiation received by sensor 324 without appreciably altering its wavelength(s). Thus, in one example filter 326 is a neutral density filter. One such suitable neutral density filter is a 16× neutral density filter supplied by Samy's Camera of Los Angeles, Calif. under the part number HDVND58. In certain implementations, sensor 324 is used to synchronize a timer that serves as a reference for linear scanning operations. In such cases, the exposure of sensor 324 to scattered or ambient light may cause synchronization errors. Thus, filter 326 is preferably configured to ensure that only direct solidification energy from solidification energy source 90 is received by sensor 324.

In accordance with a first aspect of the present disclosure, an apparatus is provided which comprises a linear solidification device having a length along a scanning axis, a linear solidification device translation assembly to which the linear solidification device is connected and which is operable to translate the linear solidification device along a travel axis, a blade having a length along a selected one of the travel axis and the scanning axis, a blade translation assembly to which the blade is connected and which is operable to traverse the blade along the other of the travel axis and the scanning axis, and a source of the solidifiable material.

Figure 2A:
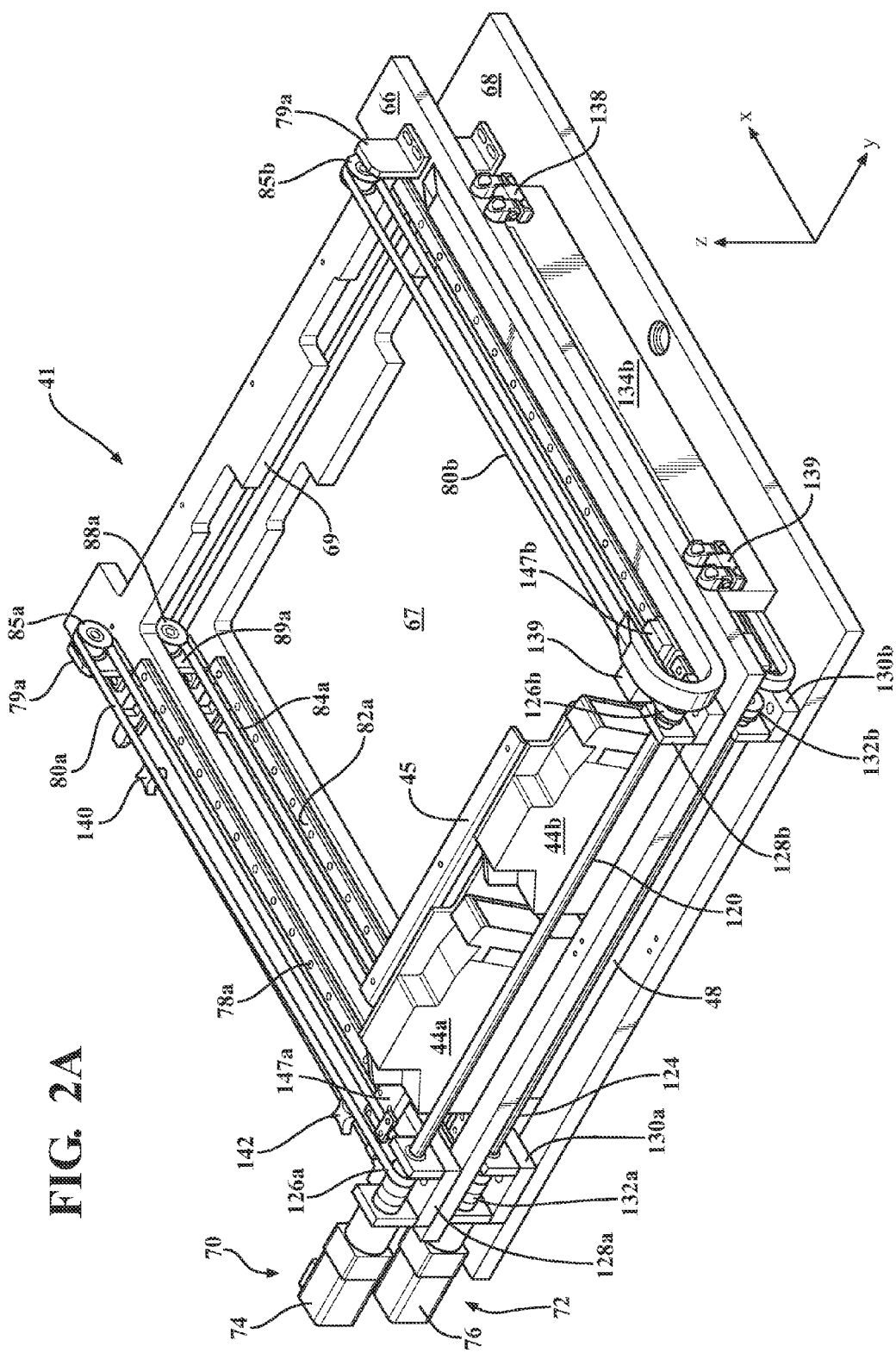
FIG. 2A is a first perspective view of a solidification assembly comprising a linear solidification device and a vacuum blade that are independently movable relative to one another, for use in the system of FIG. 1, with the laser table in a closed configuration.
Figure 2B:
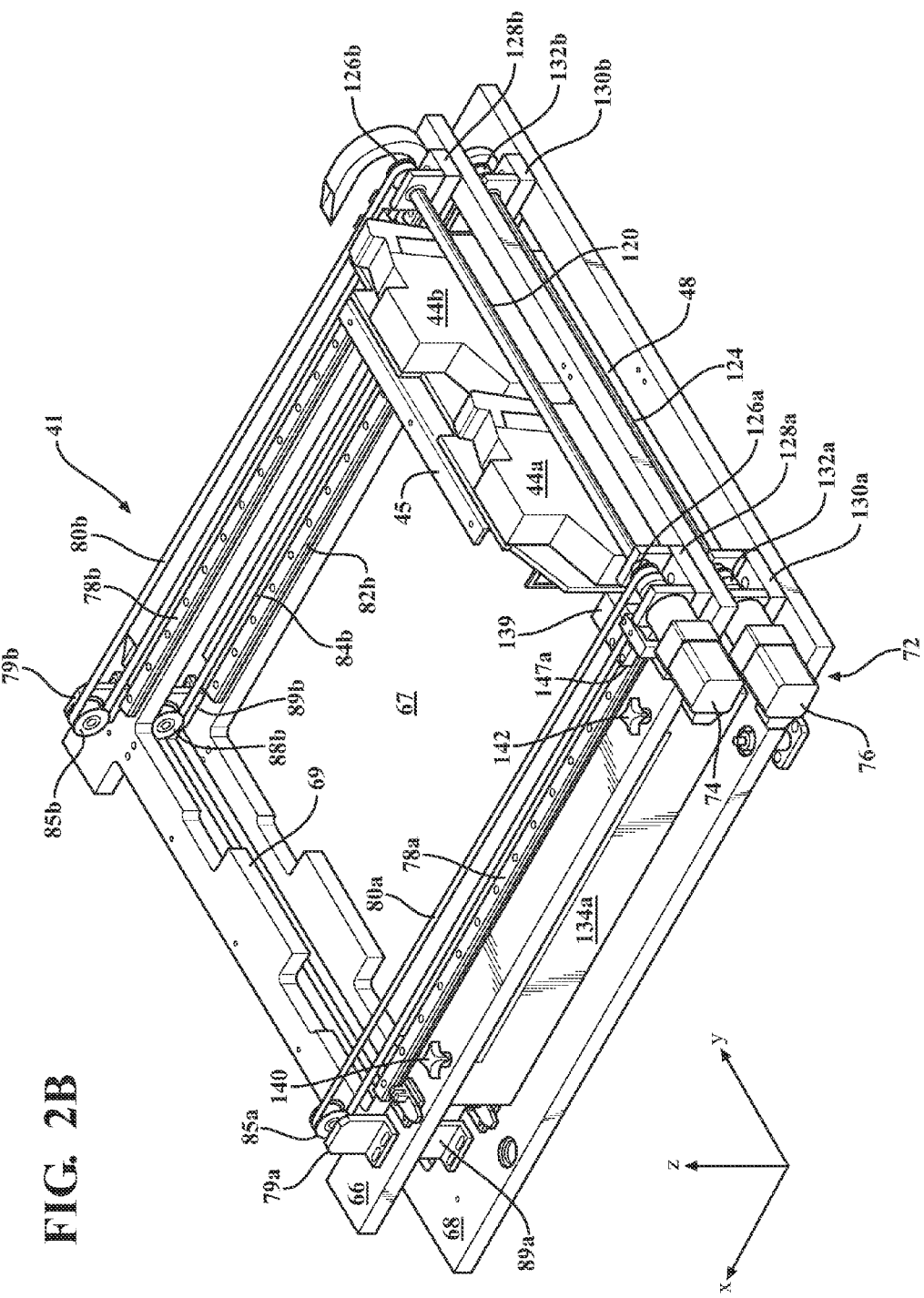
FIG. 2B is a second perspective view of the solidification assembly of FIG. 2A.

An exemplary implementation of a solidification assembly 41 useful in the foregoing apparatus is depicted in FIGS. 2A-2C. Referring to FIGS. 2A-2C, a solidification assembly 41 is depicted. Solidification assembly 41 comprises first and second linear solidification devices 44a and 44b, a linear solidification device translation assembly 70, a vacuum blade 48, and a vacuum blade translation assembly 72. In the example of FIGS. 2A-2C, the vacuum blade 48 is movable along the travel (x) axis away from or toward the linear solidification devices 44a, 44b during a solidifiable material distribution operation, and the linear solidification devices 44a and 44b are movable along the travel (x) axis away from or toward the blade 48 during a solidification operation. However, solidification assembly 41 may alternatively be configured so that the vacuum blade 48 travels along the scanning (y) axis during a solidifiable material distribution operation. In either event, it is preferred that each subsequent solidifiable material distribution operation carried out by traversing the vacuum blade 48 in a direction of travel opposite that of the previous solidifiable material distribution operation. In the configuration of FIGS. 2A-2C, the blade 48 and the support 125 (FIG. 2C) on which it is mounted are spaced apart from the bottom of the linear solidification devices 44a and 44b (e.g., the surface in which the opening 100 is formed in FIG. 5B) along the build (z) axis so that the blade 48 can travel past the linear solidification devices 44a and 44b without colliding with them. Thus, the linear solidification devices 44a and 44b on the one hand and the blade 48 on the other hand are configured for completely independent movement relative to one another, although a controller (FIG. 4) controlling their movement may do so in a coordinated fashion.

Linear solidification devices 44a and 44b are substantially identical and may be configured as shown in FIGS. 5A-5D. A cover plate 45 covers and connects linear solidification devices 44a and 44b together. Linear solidification devices 44a and 44b are configured with their respective linear openings 100 (FIG. 5B) aligned in the x-y plane so that the linear solidification devices 44a and 44b may define a single linear pattern of solidification energy extending along the entirety of the build envelope 342 (FIG. 8B) scanning (y) axis.

Linear solidification device translation assembly 70 comprises a linear solidification device motor 74 and a first pair of linear rails 78a and 78b mounted on a blade table 68. Linear rails 78a and 78b have lengths along the travel (x) axis and are spaced apart from one another along the scanning (y) axis. Linear bearings 147a and 147b slidingly engage linear rails 78a and 78b, respectively. Each linear bearing 147a and 147b is coupled to a respective timing belt 80a and 80b and to a linear solidification device support member 139 which is attached to the linear solidification device cover plate 45. Timing belt 80a is mounted on pulleys 126a and 85a, and timing belt 80b is mounted on pulleys 126b and 85b. Pulley 126a is mounted in bracket 128a which is connected to linear solidification device table 66. Pulley 85a is mounted in bracket 79a which is connected the linear solidification device table 66. Pulley 126b is mounted in bracket 128b which is connected to linear solidification device table 66, and pulley 85b is mounted in bracket 79b.

Pulleys 126a and 126b are spaced apart along opposite ends of the scanning (y) axis at the same end of the travel (x) axis, and are each mounted on shaft 120 which runs through the pulley brackets 128a and 128b. Shaft 120 is coupled to a motor shaft (not visible) in motor 74. Energization of motor 74 causes shaft 120 to rotate about its longitudinal axis. The rotation of shaft 120 causes pulleys 126a and 126b to rotate, which in turn causes timing belts 80a and 80b to circulate and rotate pulleys 85a and 85b. As timing belts 80a and 80b circulate, they pull the linear solidification devices 44a and 44b along the travel axis as the linear bearings 147a and 147b slidingly engage their respective linear rails 78a and 78b. Rotation of the motor shaft (not shown) in motor 74 in a first direction causes the linear solidification devices 44a, 44b to be traversed in a first direction along the travel axis, and rotation of the motor shaft in motor 74 in a section direction causes the linear solidification devices 44a, 44b to be traversed in a second direction along the travel (x) axis which is opposite the first direction along the travel (x) axis. As the linear solidification devices 44a and 44b are traversed along the travel (x) axis, their solidification energy sources (only a single source 90 is shown in FIGS. 5A-5D) are selectively activated while their respective polygonal mirrors 92a and 92b (only a single mirror 92 is shown in FIGS. 5A-5D) rotate. The selective activation of the solidification energy sources 90a and 90b is carried out in accordance with object data representative of the three-dimensional object 52.

Motor 74 is provided to drive linear solidification devices 44a and 44b across the exposed surface 51 of solidifiable material 50 along the travel (x) axis. In certain examples, motor 74 is a servo motor or a stepper motor. In either case, motor 74 has a motor movement parameter associated with it that corresponds to a degree of linear movement of linear solidification device 44 in the x-axis direction. In certain cases the parameter is a number of motor steps corresponding to a particular linear distance that linear solidification devices 44a, 44b move along the travel (x) axis. As linear solidification devices 44a, 44b move along the travel (x) axis, their solidification energy sources 90 and rotating energy deflectors 92 (each would have its own source 90 an deflector 92, but only one is referred to for ease of reference to FIGS. 5A-5D) move therewith. During this movement, solidification energy, preferably laser light, is periodically or continuously projected from each solidification energy source 90 to each linear solidification device's respective rotating energy deflector 92. In one preferred embodiment, solidification energy source 90 is a laser diode that emits light in the range of 380 nm-420 nm. A range of 390 nm-410 nm is preferred, and a range of from 400 nm to about 410 nm is more preferred. The laser power is preferably at least about 300 mW, more preferably at least about 400 mW, and even more preferably, at least about 450 mW. At the same time, the laser power is preferably no more than about 700 mW, more preferably no more than about 600 mW, and still more preferably no more than about 550 mW. In one example, a 500 mW, 405 nm blue-light laser is used. Suitable blue light laser diodes include 405 nm, 500 mW laser diodes supplied by Sanyo.

Blade translation assembly 72 comprises a blade translation motor 76 and a second pair of linear rails 82a and 82b mounted on blade table 68. Linear rails 82a and 82b have lengths along the travel (x) axis and are spaced apart from one another along the scanning (y) axis. Linear bearings 149a (FIGS. 2C) and 149b (not shown) slidingly engage linear rails 82a and 82b, respectively. Each linear bearing 149a and 149b is coupled to a respective timing belt 84a and 84b and to blade horizontal support member 125 (FIG. 2C). As shown in FIG. 2C, the blade horizontal support member 125 is connected to the upper surface 134 of blade 48 via vertical support members 129a and 129b. Port 131 is also provided for fluidly coupling blade cavity 138 to a vacuum pump. As indicated previously, the orientation of the blade translation assembly 72 could be rotated by 90 degrees (when viewed from above) so that the vacuum blade 48 travels along the scanning (y) axis of the linear solidification devices 44a, 44b instead of along their travel (x) axis.

Timing belt 84a is mounted on pulleys 132a and 88a, and timing belt 84b is mounted on pulleys 132b and 88b. Pulley 132a is mounted in bracket 130a which is connected to blade table 68. Pulley 88a is mounted in bracket 89a which is connected the blade table 68. Pulley 132b is mounted in bracket 130b which is connected to blade table 68, and pulley 88b is mounted in bracket 89b (FIG. 2B), which is also connected to blade table 66.

Pulleys 132a and 132b are spaced apart along opposite ends of the scanning (y) axis at the same end of the travel (x) axis, and are each mounted on shaft 124 which runs through the pulley brackets 130a and 130b. Shaft 124 is coupled to a motor shaft (not visible) in motor 76. Energization of motor 76 causes shaft 124 to rotate about its longitudinal axis. The rotation of shaft 124 causes pulleys 130a and 130b to rotate, which in turn causes timing belts 84a and 84b to circulate and rotate pulleys 88a and 88b. As timing belts 84a and 84b circulate, they pull the blade 48 along the travel axis as the linear bearings 149a (FIG. 2C) and 149b (not shown) slidingly engage their respective linear rails 82a and 82b. Rotation of the motor shaft (not shown) in motor 76 in a first direction causes the blade 48 to be traversed in a first direction along the travel axis, and rotation of the motor shaft in motor 76 in a section direction causes the blade 48 to be traversed in a second direction along the travel (x) axis which is opposite the first direction along the travel (x) axis.

First and second adapters 134a and 134b are generally rectangular members that are positioned between respective sides of the blade table 68 and linear solidification device table 66 and which are spaced apart from one another along the scanning (y) axis. The adapters 134a and 134b provide vertical (z-axis) support for the linear solidification device table 66. Second adapter 134b (FIGS. 2B-2C) include hinges 138 and 139 which connect second adapter 135b to linear solidification device table 66. The hinges 138, 139 define a pivot axis and allow the linear solidification device table 66 to pivot about the pivot axis, which is parallel to the travel (x) axis, as shown in FIG. 2C. Knobs 140 and 142 (FIG. 2B) are connected to threaded shafts (not shown) which project through openings 151 and 145 (FIG. 2C) on the side of the linear solidification device table 66 that rests on adapter 134a. The knobs 140 and 142 can be selectively manipulated to lock the blade table 68 into place relative to the linear solidification device table 66, as shown in FIGS. 2A and 2B.

In accordance with a second aspect of the present disclosure, an apparatus is provided which comprises a solidifiable material container that contains a solidifiable material which has an exposed surface, a linear solidification device that is movable along a travel axis while scanning solidification energy along a scanning axis onto the exposed surface of the solidifiable material, a blade that is movable along a selected one of the travel axis and the scanning axis, wherein the blade has a length along the other of the scanning axis and the travel axis, an upper surface, and a lower surface, and the lower surface is located between the upper surface and the exposed surface of the solidifiable material of the build axis, a level sensor positioned to detect the height of the exposed surface of the solidifiable material in the solidifiable material container, a level compensator that is movable along the build axis within the solidifiable material, and a level controller operatively connected to the level sensor and the level compensator, wherein the level controller is programmed to adjust a position of the level compensator along the build axis based on the height of the exposed surface of the solidifiable material in the solidifiable material container.

FIG. 1 depicts an illustrative example of the foregoing apparatus. Level compensator 62 is a solid rectangular block, preferably formed from a metal capable of withstanding contact with solidifiable material 50 without reacting with the material 50. Level compensator 62 is connected to a suitable translation assembly (not shown) to move the compensator 62 up and down along the build (z) axis. As the depth of the compensator 62 beneath exposed surface 51 of solidifiable material 50 varies, the height hi of the exposed surface 51 relative to the bottom of the solidifiable material container 46 will vary because the compensator 62 will displace a volume of solidifiable material 50 substantially equal to the volume of the compensator 62 that is submerged within solidifiable material 50. An optical level sensor 64 is provided which transmits light that is reflected back to sensor 64. The variation in the time required for the reflected light to return to sensor 64 is directly indicative of the variation in the distance $\Delta h$ between the sensor 64 and the exposed surface 51 of the solidifiable material. The distance from the optical sensor to the bottom of the solidifiable material container 46 is $h_2$, wherein $h_2 = h_1 + \Delta h$. The height of the vacuum blade 48 along the build (z) axis relative to the bottom of the solidifiable material container 46 is fixed, as is the height of the bottom surface 136 of the vacuum blade 48 relative to the level sensor 64. Therefore, controlling any of $h_1$, $h_2$ or $\Delta h$ effectively controls the distance from the bottom surface 136 of vacuum blade 48 to the exposed surface 51 of the solidifiable material (referred to as the "Exposed surface spacing" in FIG. 3B), where the term "exposed surface" refers to the portion of the solidifiable material 50 that is away from the meniscus m in the x-y plane.

Figure 4:
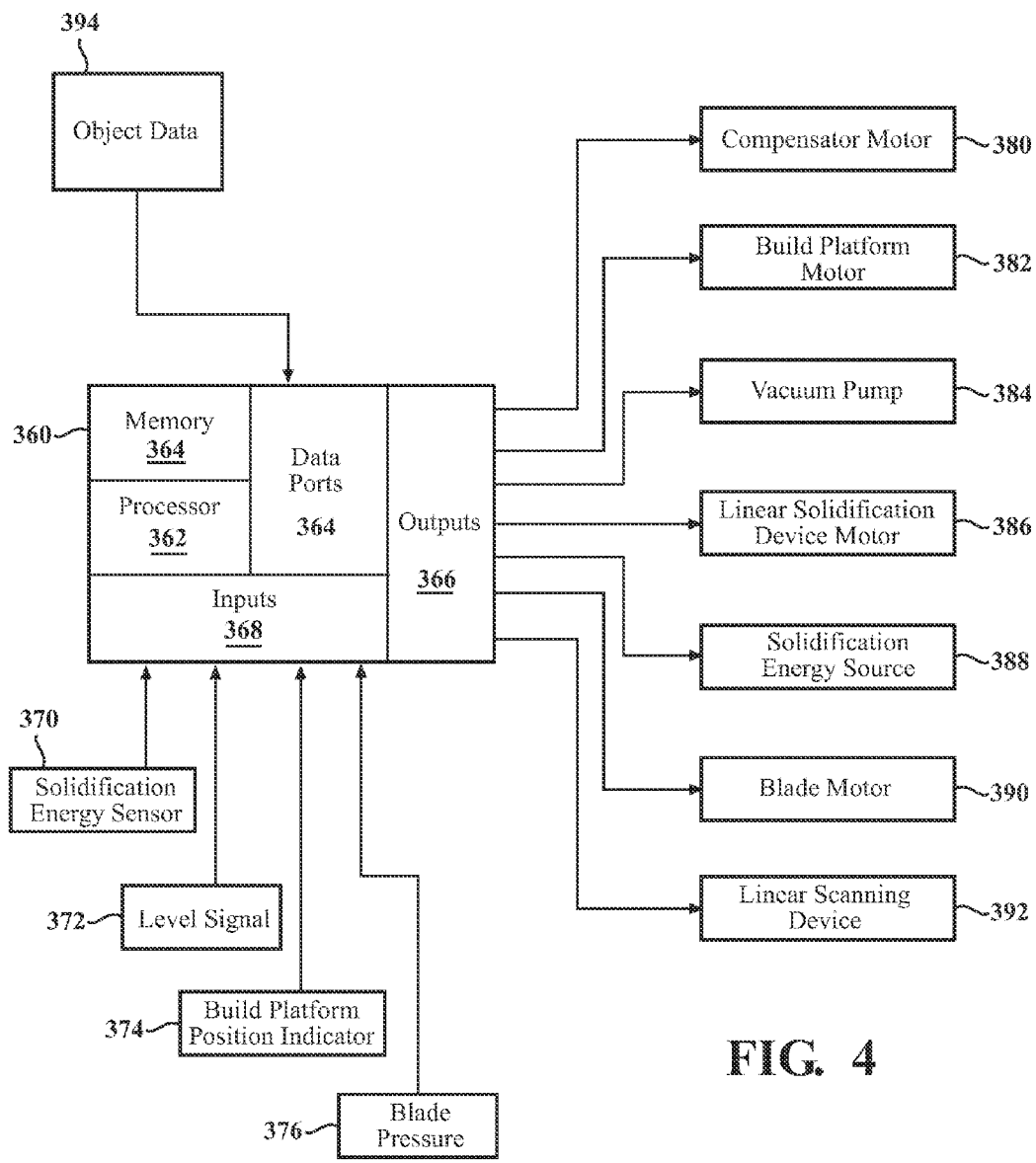
FIG. 4 is a schematic of a controller for use in operating the system of FIG. 1.

In accordance with certain examples, at least one controller is provided for operating linear solidification device 44, blade 48, level compensator 62, and build platform 42. Referring to FIG. 4 a schematic of a controller 360 for operating these devices is depicted. The controller 360 may comprise multiple controllers assigned to carry out select functions or one controller as depicted. Controller 360 comprises a memory 364 which may comprise random access memory, read only memory, and non-volatile storage memory (e.g., a hard drive) for storing computer programs comprising computer executable instructions. Controller 360 also comprises a processor 362, an input section comprising a variety of input ports 370-376 and an output section comprising a plurality of output ports 380-392.

Input ports include a port 370 for receiving a solidification energy sensor signal from sensor 324 (FIGS. 5C and 5D), a port 372 for receiving a level signal from level sensor 64, a build platform position indicator for receiving a signal indicative of the height of the build platform 42 relative to the bottom of the solidifiable material container 46, and a blade pressure signal port for receiving a signal indicative of the blade pressure in cavity 138 above the level of liquid therein. The output ports include an output port 380 for transmitting an actuating signal to a level compensator build (z) axis translation motor (not shown), a port 382 for transmitting an actuating signal to a build platform motor (not shown) for translating the build platform 42 along the build (z) axis, a port 384 for transmitting a signal to a vacuum pump to adjust the pressure in blade cavity 138, a port 386 for transmitting an actuating signal to a linear solidification device travel (x) axis translation motor (such as motor 74 in FIGS. 2A-2C), a port 388 for transmitting a signal to a solidification energy source modulator to change the energization state of the solidification energy source 90 from OFF to ON or vice-versa, a port 390 for transmitting an actuating signal to a blade translation motor (such as motor 76 in FIGS. 2A-2C), and a port 392 for transmitting an actuating signal to a linear scanning device motor or actuator (such as motor 118 in FIG. 5A).

Controller 360 also includes one or more data ports, including a data port 394 for receiving object data representative of the three-dimensional object which is used by the processor 362 along with computer executable instructions to determine the selective activation of the solidification energy source 90 based on the position of linear solidification device 44 along the travel (x) axis, or in the case of FIGS. 2A-2C, to determine the selective activation of the solidification energy sources in each linear solidification devices 44*a* and 44*b*.

A method of making a three-dimensional object in accordance with a third aspect of the present disclosure will now be described. In accordance with the method, a linear solidification device and a blade are provided. The blade is traversed along a selected one of a scanning axis and a travel axis relative to the linear solidification device while contacting the blade with the solidifiable material. The linear solidification device is traversed along the travel axis relative to the blade while scanning solidification energy onto the solidifiable material along a scanning axis. In certain examples, during the step of traversing the blade along a selected one of the scanning axis and the travel axis relative to the linear solidification device while contacting the blade with the solidifiable material, the blade travels toward the linear solidification device, and during the step of traversing the linear solidification device in the first direction along the travel axis relative to the blade while scanning solidification energy onto the solidifiable material along a scanning axis the linear solidification device travels away from the blade. In other examples, during the step of traversing the blade along a selected one of the scanning axis and the travel axis relative to the linear solidification device while contacting the blade with the solidifiable material the blade travels away from the linear solidification device, and during the step of traversing the linear solidification device in the first direction along the travel axis relative to the blade while scanning solidification energy onto the solidifiable material along a scanning axis the linear solidification device travels toward from the blade. In accordance with other examples, the blade travels in opposite directions along the selected one of the scanning axis and the travel axis during each successive traversing step while dispensing solidifiable material in depleted regions at the exposed surface of solidifiable material.

In one exemplary method, the solidification assembly 41 of FIGS. 2A-2C is positioned with the central opening 67 of the blade table 68 over the open top of a solidifiable material container 46 (FIG. 1) so that the build platform 42 is located in the x-y region of the blade table opening 67 and the linear solidification device table opening 69. The blade 48 is positioned relative to the exposed surface 51 of solidifiable material 50 as described previously with respect to FIGS. 1 and 3B. Assuming a layer of the three-dimensional object 52 has just been formed, the exposed object surface 58 will be substantially co-planar with the exposed solidifiable material surface 51. A build platform motor (not shown) is operated to descend the build platform 42 by one layer thickness Δz. In the region above the exposed object surface 58, the solidifiable material 50 will be depleted because of its viscosity and the time required for solidifiable material to flow over the exposed object surface 58.

Motor 76 is energized to traverse vacuum blade 48 in a first direction along the travel (x) axis away from linear solidification devices 44*a* and 44*b*. The energization of motor 76 causes timing belts 84*a* and 84*b* to circulate, which pulls the blade support 125 and blade 48 in the first direction as the linear bearings 149*a* (FIG. 2C) and 149*b* (not shown) slidingly engage their respective linear rails 82*a* and 82*b*. During this step, motor 74 is not activated to traverse the linear solidification devices 44*a* and 44*b*, which remain stationary. Once the blade 48 reaches the end of travel along the travel (x) axis, motor 74 is activated to cause timing belts 80*a* and 80*b* to circulate, which pulls the linear solidification devices 44*a* and 44*b* in the first direction along the travel (x) axis toward the (now stationary) blade 48. As the linear solidification devices move along the travel axis, their respective motors 118 (FIG. 5A) are energized to rotate their respective polygonal mirrors 92 at substantially constant rotational frequencies. The respective solidification energy sources 90 in each linear solidification device 44*a* and 44*b* are selectively energized and de-energized as the linear solidification devices move along the travel (x) axis and as the polygonal mirrors 92 rotate, to scan solidification energy in linear patterns along the exposed surface 51 of solidifiable material 50, wherein the linear patterns correspond to object data for a given layer of the object 52. Eventually, the linear solidification devices 44*a* and 44*b* reach an end of travel position in the first direction along the travel (x) axis, and motor 74 is deactivated. The build platform motor (not shown) is operated to descend build platform 42 by a layer thickness Δz.

At this point, motor 76 is operated to cause the blade 48 to travel in a second direction along the travel (x) axis away from the linear solidification devices 44*a* and 44*b*, while the linear solidification devices 44*a* and 44*b* remain stationary. Once blade 48 reaches its end of travel position in the second direction along the travel (x) axis, motor 76 is deactivated, and motor 74 is operated to cause the linear solidification devices 44*a* and 44*b* to travel in the second direction along the travel (x) axis toward the blade 48. The process repeats itself until the object is complete.

In the foregoing method, solidification is bi-directional, i.e., solidification energy is scanned along the solidifiable material as the linear solidification devices 44*a* and 44*b* travel in both the first and second directions along the travel (x) axis. Bi-directional solidification is generally preferred to ensure shorter object build times. However, in certain examples, uni-directional solidification is used. In such cases, the blade 48 traverses along the travel (x) axis prior to each solidification operation to ensure that the exposed surface 51 of solidifiable material is substantially planar prior to solidification. In preferred example, the blade travels in opposite directions during each successive traversing step so as to dispense solidifiable material to depleted regions at the exposed surface of solidifiable material.

Referring again to FIGS. 5B during an object solidification operation, rotating energy deflector 92 deflects solidification energy that is incident upon it toward flat field lens 98. In the case of FIGS. 5C-5D, rotating energy deflector 92 deflects solidification energy that is incident up on it towards F-theta lenses 328 and 330.

Rotating energy deflector 92 preferably rotates in a rotation plane as linear solidification device 44 moves along the travel (x) axis. In certain examples, the rotation plane is substantially perpendicular to the travel (x) axis (i.e., the rotation plane is the y-z plane shown in FIGS. 1-2C, and 5A-5D). In certain examples, rotating energy deflector 92 rotates at a substantially constant rotational speed. In other examples, the linear solidification device 44 moves at a substantially constant speed along the travel (x) axis. In further examples, the rotating energy deflector 92 rotates at a substantially constant rotational speed and the linear solidification device 44 moves along the travel (x) axis at a substantially constant speed.

When solidification energy source 90 is a light source, rotating energy deflector 92 is preferably a rotating light deflector capable of deflecting visible or UV light. In one exemplary embodiment, rotating energy deflector 92 is a polygonal mirror having one or more facets 94a, b, c, etc. defined around its perimeter. In the example of FIGS. 5B-5D, rotating energy deflector 92 is a hexagonal mirror having facets 94a to 94f. Each facet 94a-94f has at least one rotational position, and preferably several, at which it will be in optical communication with solidification energy source 90 to receive light projected therefrom. As the rotating energy deflector 92 rotates, solidification energy (e.g., visible or ultraviolet light) will be deflected along the length of each facet 94a-f in succession. At any one time, one of the facets 94a-94f will receive and deflect solidification energy. As the facet changes its rotational position, the angle of incidence of the solidification energy with respect to the facet will change, altering the angle of deflection, and therefore, the y-axis location at which the deflected solidification energy strikes the solidifiable material. Thus, each rotational position of rotating energy deflector 92 corresponds to a position along the scanning (y) axis at which solidification energy may be projected at a given time. However, for a given number of rotating energy deflector facets F, there will be F rotational positions that each correspond to a particular position along the scanning axis direction. As will be discussed in greater detail below, one or more controllers or microcontrollers may be provided to regulate the activation and deactivation of the build platform 42, solidification energy source 90, rotating energy deflector 92, and motor 76 that drives the linear solidification device 44 across the solidifiable material.

In certain examples, the maximum length of scan along the scanning (y) axis will correspond to the full length of an individual facet 94a-94f. That is, as the light progressively impinges on the entire length of any one facet 94a-94f, the deflected light will correspondingly complete a full scan length in the y-axis direction. The number of facets 94a, 94b, etc. on the rotating energy deflector 92 will correspond to the number of y-axis scans that are performed for one complete revolution of rotating energy deflector 92. In the case of a hexagonal mirror, six y-axis scans will occur for every complete rotation of rotating energy deflector 92. For rotating energy deflectors 92 that maintain a constant rotational direction (e.g., clockwise or counterclockwise), the scans will be uni-directional along the y-axis. Put differently, as light transitions from one facet 94a to another 94b, the scan will return to its starting position in the y-axis, as opposed to scanning back in the opposite direction. However, other rotating energy deflector configurations may be used including those in which the rotating energy deflector 92 rotates in two rotational directions to produce a "back and forth" scan in the y-axis direction.

It is useful to use the term "build envelope" to describe the maximum length (in the x-direction) and maximum width (in the y-direction) in which solidification energy may be supplied to the solidifiable material. In the embodiment of FIGS. 2A-2C, the build envelope area will typically be less than the area of blade table opening 67 and should be no larger than the x-y area of the build platform 42 (FIG. 1). In general, the build envelope will comprise an x-dimension (length) that is less than or equal to the full distance that the solidification energy source 90 and rotating energy deflector 92 can traverse in the x-direction. In some cases, the y-dimension (width) of the build envelope may be somewhat longer than the length of lens 98 and housing opening 100 because light projected from flat field lens 98 and through housing opening 100 may be projected outwardly from housing 96 in the y-axis direction at a non-orthogonal angle of incidence with respect to the exposed surface of the solidifiable material.

Figure 8A:
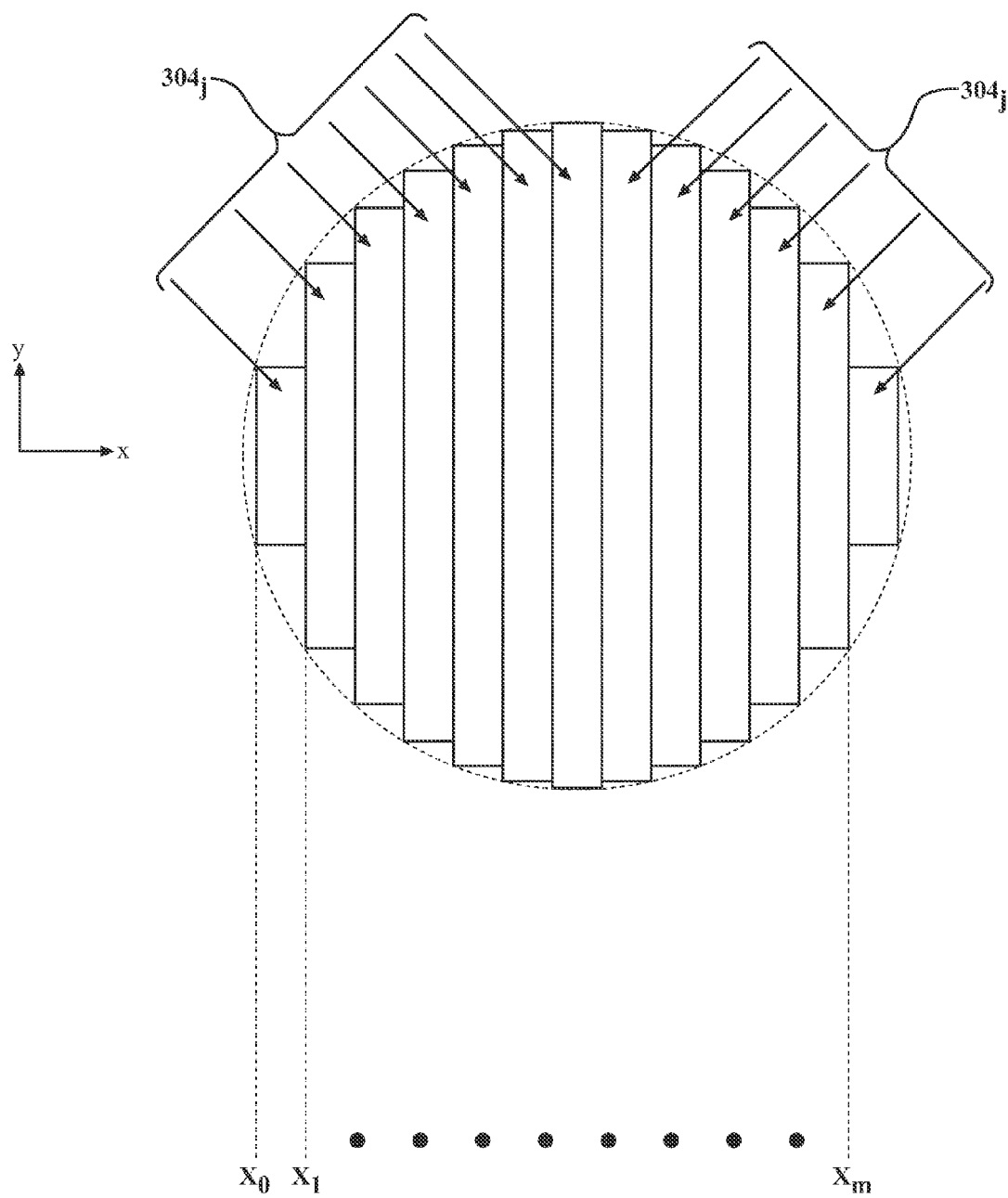
FIG. 8A is a graphical representation of object cross-section strip data corresponding to one of the slices of a three-dimensional object shown in FIG. 7.
Figure 8C:
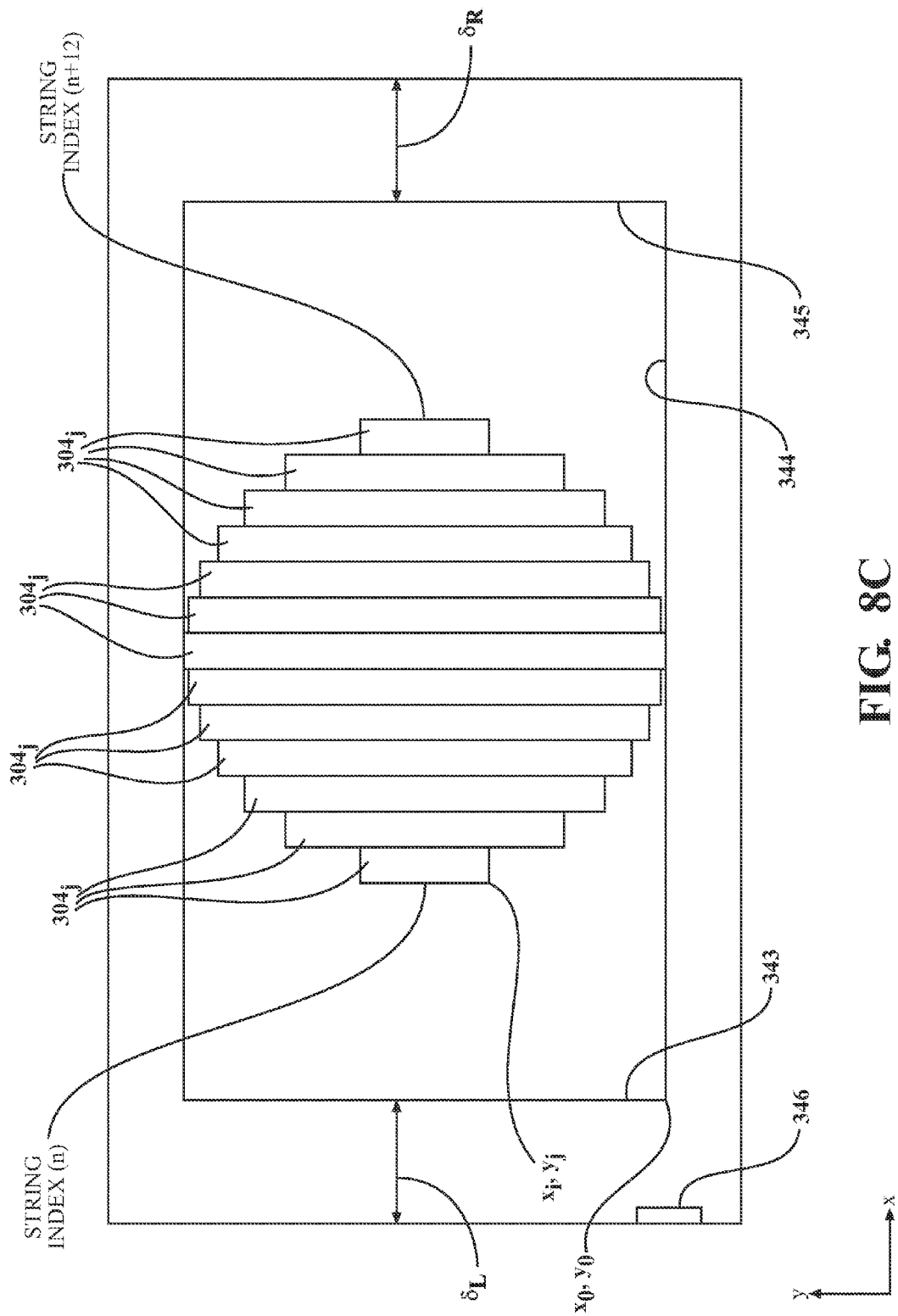
FIG. 8C is a top plan view of the source of solidifiable material of FIG. 8B with the object cross-section strip data of FIG. 8A mapped onto the build envelope.

FIGS. 8B and C depict a top view of a region of solidifiable material 50 which includes a build envelope 342. The build envelope 342 defines the maximum area of solidification, and therefore, the maximum area of the three-dimensional object in the x-y plane. As shown in FIGS. 8B and 8C, in certain cases the linear solidification device 44 is movable along the travel (x) axis along a total distance that equals the sum of a build envelope 342 length distance L and two offset distances, $\delta_L$ and $\delta_R$. The offset distances $\delta_L$ and $\delta_R$ respectively represent the distance from the left end-of-travel (EOT) position of linear solidification device 44 to the left-hand side build envelope boundary 343 and the distance from the right-hand side EOT position to the right-hand side build envelope boundary 345. In certain examples, the offset distances, $\delta_L$ and $\delta_R$ are provided to ensure that the linear solidification device 44 has time to achieve a substantially constant speed as it moves along the travel (x) axis before any solidification of solidifiable material will begin (i.e., before build envelope 342 is reached). In certain examples, the movement of the linear solidification device 44 at a constant travel (x) axis speed avoids the necessity of directly measuring the travel (x) axis position at any given moment because it allows a motor movement parameter for motor 74 to provide an indirect indication of travel (x) axis position. In one particular example suitable for servo and stepper motors, the motor movement parameter is a number of motor steps. In certain examples, $\delta_L$ and $\delta_R$ are equal.

In certain examples, as rotating energy deflector 92 rotates, solidification energy source 90 will selectively project light in accordance with data that represents the object being built. At a given location along the travel (x) axis direction, some scanning (y) axis locations may be solidified and others may not, depending on the shape of the object being built.

One way of selectively projecting light to the solidifiable material is to selectively activate the solidifiable energy source 90 depending on the travel (x) axis location of the linear solidification device 44 and the rotational position of the facet 94a-f that is in optical communication with the solidification energy source 90. While each facet 94a-94f will have a full range of locations along its length at which solidification energy may be received from solidification energy source 90, it will not necessarily be the case that each such facet location will receive solidification energy during any individual scan performed by that facet. Thus, by (directly or indirectly) coordinating the activation of solidification energy source with the rotational position of a given facet 94a-94f, solidification energy can be selectively provided to only those locations along the y-axis where solidification is desired.

The number of linear scans that can be performed within a given linear distance along the travel (x) axis direction may depend on several variables, including the rotational speed of rotating energy deflector 92, the number of facets F on the rotating energy deflector 92, and the speed of movement of the linear solidification devices 44a or 44b (or one linear solidification device 44 if only one is provided) along the travel (x) axis. In general, as the speed of movement of the linear solidification devices 44a and 44b along the travel (x) axis increases, the number of linear scans per unit of travel (x) axis length decreases. However, as the number of facets on the rotating energy deflector 92 increases or as the rotational speed of the rotating energy deflector 92 increases, the number of linear scans per unit of x-axis length increases.

Thus, for a given build envelope distance L in units such as millimeters, the maximum number of line scanning operations that can be performed may be calculated as follows:

$$N_{max} = (L/S)*(RPM/60)*F \quad (1)$$

wherein, $N_{max}$=maximum number of line scanning operations along the travel (x) x-axis direction within the build envelope;
L=desired length of the build envelope along the travel (x) axis (mm);
S=speed of movement of linear solidification devices 44a, 44b along the travel (x) axis (mm/sec);
RPM=rotational frequency of rotating energy deflector 92 (revolutions/minute); and
F=number of facets on the rotating energy deflector 92.

Each linear scan can then be assigned a linear scan index n ranging from a value of 0 to $N_{max}-1$, wherein $N_{max}$ is the total number of linear scans. As explained further below, in certain examples, object data may be provided in the form of string data comprising a plurality of sets of data strings, wherein each set of data strings corresponds to a layer of the object, and each data string corresponds to a scan line. In such cases, the linear scan index n may also be referred to as a "string index" because each scan line will correspond to a particular data string in the set of data strings that defines an object layer.

Equation (1) can also be used to calculate an actual number of line scanning operations needed for a given part length in the x-axis direction. In that case, L would be the desired length of the part along the travel (x) axis direction and $N_{max}$ would be replaced by N, which would represent the total number of line scanning operations used to form the part.

When the linear solidification devices 44a, 44b are moving at a constant speed S along the travel (x) axis, a motor movement parameter such as a number of motor steps for motor 74 may be correlated to the build envelope length L and used to define a variable W which equals a number of motor steps/L. The controller 360 (FIG. 4) which may be a microcontroller unit) can then use the number of motor steps to indirectly determine the number of a linear scan (or string index as described further herein) position of the linear solidification devices 44a, 44b within the build envelope in accordance with the following equation:

$$\text{scan index } n = ((\text{number of steps from boundary})/(W)(S))*(RPM/60)*F \quad (2)$$

In equation (2), the number of steps from the boundary refers to the number of motor steps counted starting at build envelope boundary 343 and moving from left to right or starting at build envelope boundary 345 and moving from right to left. A particular three-dimensional object layer having a length may be formed by a number of linear scans performed within build envelope 342.

In certain examples, a host computer will assign scan index numbers or string data index numbers by scaling the part to the build envelope size and assigning a scan index number n based on the total number of possible scans $N_{max}$ in the build envelope 342. The scan index numbers n will then be correlated to a number of motor steps as set forth in equation (2). This relationship depends, in part, on the accuracy of the value W which is the ratio of the number of steps required for the linear solidification device 44 to traverse the build envelope length L (FIG. 8B) divided by L. As explained below, in some cases, W may deviate from the value predicted by geometry of the mechanical devices used to move the linear solidification device 44 (i.e., the value predicted by the gear ratio for motor 74, the rotational speed of motor 74, and the pulley diameter of pulleys 85a and 85b). In that case, it may be desirable to adjust the value of W. One phenomenon that causes deviations in the value of W is referred to as "gear backlash." Gear backlash is a clearance between the mating gear teeth which provides space for a film of lubricating oil between the teeth. When the rotation of the internal shaft of motor 74 is used to determine the travel (x) axis position of linear solidification devices 44a and 44b, gear backlash causes in inaccurate determination of the travel (x) axis position because the shaft internal motor shaft will rotate by an amount that will not correspond to the rotation of shaft 120. Backlash may be quantified in units of arcseconds. An arcsecond is (1/60) degree or (π/10800) radians. In some cases, in particular those in which bi-directional scanning (scanning when the linear solidification device moves in both directions along the scanning axis) is used and in which the linear solidification device translation motor 74 shaft movement is used as an indicator of the travel (x) axis location of the linear solidification devices 44a, 44b, small amounts of gear backlash in the linear solidification device translation motor 74, such as amounts of backlash on the order of arcseconds, may produce an undesirable "offset" in the resulting part along the travel (x) axis. Methods of adjusting a motor movement parameter, such as the parameter W, to account for gear backlash are described further below.

In accordance with certain implementations of the three-dimensional object manufacturing processes and apparatuses described herein, a method of representing object data for use in controlling the action of linear solidification device 44 is illustrated in FIGS. 6-8G. Typical file types used to generate object data include STL (Stereo Lithography) files or other CAD (Computer Aided Drafting) files commonly translated for rapid prototyping systems into formats such as SLC, CLI slice data files or voxelized data files which may include data formats such as BMP, PNG, etc. However, any data input type may be used and converted internally to create the image data used by the linear solidification device 44. The object data corresponds to the energy pattern supplied by linear solidification device 44 and may be generated by a control unit or by an external source or device (e.g., a network or storage device).

Figure 6:
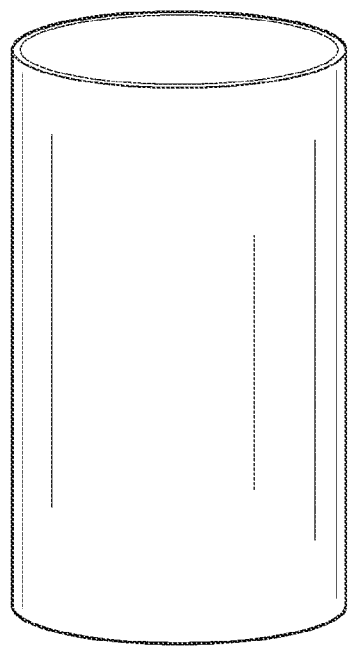
FIG. 6 is a graphical depiction of three-dimensional object data for use in making a three-dimensional object using a linear solidification device.
Figure 7:
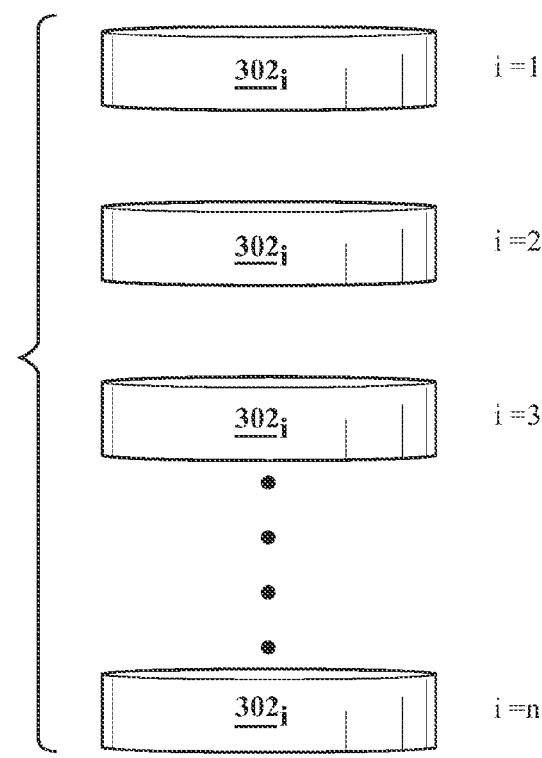
FIG. 7 is a graphical representation of sliced data representative of the three-dimensional object of FIG. 6.

As an exemplary three-dimensional object, a simple cylinder 300 is shown in FIG. 6. Locations on or within the cylinder can be characterized by x, y, and z-axes as shown. In certain linear solidification device implementations, the intensity and duration of solidification energy supplied at a particular x, y location cannot be controllably varied. As a result, those locations in the x, y plane which receive solidification energy will solidify to substantially the same depth. In such implementations, it can be useful to perform a data "slicing" operation in which a computer representation of the three-dimensional object is sliced to create a plurality of sections in the build axis (z-axis) direction, each representing a uniform depth across at all points across the x-y plane. Each such section may mathematically correspond to or be represented by an object layer data set. One exemplary illustration of such slices is graphically depicted in FIG. 7. As shown in FIG. 7, a data representation of the object 300 can be further represented as a plurality of build axis (z-axis) slices $302_i$, wherein the total number of slices n is substantially equal to the height of the object as built divided by the depth of solidification provided by linear solidification device 44. The slices $302_i$ may be represented mathematically be object layer data sets in which each layer is defined by x, y coordinates representing its contours and a z-axis value representing its location along the build axis, with Δz values between adjacent slices representing the thickness of the layer.

Each object layer data set may be represented graphically as a plurality of strips having a length along the scanning axis (y-axis) direction and a width along the x-axis direction, with the strips being arranged width-wise along the x-axis direction. Referring to FIG. 8A, a view taken along the vertical (z-axis) direction of a graphical representation of an individual object data slice $302_i$ is provided. The individual slice $302_i$ may be represented as a plurality of adjacent strips $304_j$, which is represented as m strips. The dashed line is not part of the data representation, but is provided to show the generally circular shape defined by strips $304_j$. In the example of FIG. 8A, the strips have a width corresponding to the direction of movement of the linear solidification device 44 (travel (x) axis) and length corresponding to a direction other than the direction of linear solidification device 44 movement (scanning (y) axis). In the specific example of FIG. 9A, the strip length direction is substantially perpendicular to the travel (x) axis.

Each strip $304_j$ graphically depicts a data representation (preferably provided in a form that is readable by a computer processor) of those locations of solidifiable material that will be solidified in the y-axis direction for a given x-axis location. The locations may also be defined relative to build envelope boundaries such as the scanning axis boundary 344 and the x-axis boundaries 343 and 345 of FIG. 8B. The control unit 360 receives data indicating the location of solidification energy in the x-axis direction, for example, as indicated by the position of linear solidification device 44 in the x-axis direction. The control unit 360 (FIG. 4) also receives the data representation (strips $304_j$) and directly or indirectly associates each strip $304_j$ with an x-axis position in the build envelope 342 defined within the exposed surface of the solidifiable material. Thus, a position within a strip on the data representation corresponds to a position on the exposed surface of the solidifiable material.

In FIG. 8A xo corresponds to the position of the linear solidification device 44 at which solidification will begin. The increment $x_1$-$x_0$ represents the width of solidification along the travel (x) axis direction provided by linear solidification device 44. Thus, when linear solidification device 44 is at position $x_0$, solidification energy source 90 will supply solidification energy when a facet 94a-f with which it is in optical communication has a rotational position corresponding to the y-axis locations in the build envelope 342 where the strip defined between $x_0$ and $x_1$ is present. When two linear solidification devices 44a and 44b are used (FIGS. 2A-2C), their solidification energy sources 90 will be selectively activated in coordination with their rotating polygon mirrors 92 to define a linear pattern at position xo of width $x_1$-$x_0$.

In the illustrated embodiments of FIGS. 5A-C, the length of one facet 94(a)-(f) of rotating energy deflector 92 corresponds to the maximum scannable y-axis dimension of the build envelope 342, i.e., the maximum length of solidification in the y-axis direction. However, any individual strip $304_j$ may correspond to a y-axis solidification length less than the maximum scannable y-axis build envelope dimension. When two linear solidification devices 44a and 44b are used (FIGS. 2A-2C), the length of one facet 94(a)-(f) of the rotating energy deflectors of each linear solidification device 44a, 44b will correspond to approximately ½ of the maximum scannable y-axis dimension of build envelope 342. However, the scanning (y) axis scan lengths of each facet 94(a)-(f) of linear solidification devices 44a, 44b may be slightly greater than ½ of the maximum scanning (y) axis scan length to prevent scanning (y) axis gaps in the scanning (y) axis transition region between linear solidification devices 44a and 44b.

As linear solidification devices 44a and 44b move along the travel (x) axis, they will solidify regions of solidifiable material 50 corresponding to each strip 304j. Each x-axis location corresponds to a particular strip 304j. In certain embodiments, a linear encoder is operatively connected to linear solidification device translation motor 74 and/or shaft 120 to determine the x-axis position of linear solidification devices 44a and 44b.

The object layer data that is graphically illustrated in FIG. 8A may be mapped onto a build envelope 342 as shown in FIG. 8C. Each strip 304j may be defined by an x coordinate (or x-coordinate pairs) and one or more y-coordinates which define the regions of solidification at the particular x-axis location.

In certain examples, each strip 304j may be represented by a corresponding data string. In a preferred embodiment, each data string comprises a set of time values. In another preferred embodiment, the data strings comprise a string number n and a set of time values. In certain cases, the string number n corresponds to a linear scan number. For example, using formula (1) described previously, a maximum number of linear scans ($N_{max}$) may be calculated for a build envelope length L and each linear scan will have a corresponding string index number n associated with it, wherein n ranges in value from 0 to $N_{max}$−1. For any particular object layer, regions of the build envelope 342 along the travel (x) axis may not be solidified and may not be scanned. Nevertheless, all regions at which a unique linear scan may occur in the x-axis direction may be assigned a string index number. Thus, for a given speed of linear solidification device translation motor 74, a given number of facets F of a rotating energy deflector 92 and a given rotational speed of rotating energy deflector 92, there will be a maximum number of linear scans $N_{max}$ within build envelope 342 and a corresponding number of sets of data strings, each of which may or may not have actual scan data (object data) in it, depending on whether any scanning is to occur at its corresponding x-axis location. In the example of FIG. 8C, thirteen linear scans are used to form the object layer represented by strips 304j and each linear scan corresponds to a linear scan index ranging from n to n+12 and a unique set of string data having a string index ranging from n to n+12.

Figures 8D, 8E:
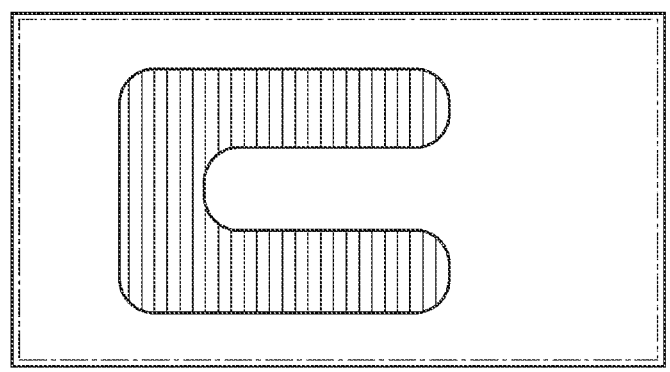
FIG. 8D is a table depicting exemplary sets of data strings which correspond to the object cross-sectional strip data of FIG. 8C.
FIG. 8E is an exemplary depiction of object cross-sectional strip data mapped onto a build envelope used to illustrate a method of making adjacent layers of a three-dimensional object using a linear solidification device.

FIG. 8D provides a table that illustrates an exemplary set of data strings that correspond to the object strips shown in FIGS. 8C and 8D. The string indices begin with n=0 at the left-hand border ($x_0$) of build envelope 342 and end at a maximum string number $N_{max}-1$ at the right hand border of the build envelope 342. Thus, certain sets of data strings will not have any object data associated with them because they do not correspond to x-axis locations where solidification where occur. In FIG. 8D no solidification occurs prior to string index n=20 and no solidification occurs after the string index n+12. Thus, there are no entries in the table of FIG. 8D for the x-axis locations at which no solidification occurs within build envelope 342.

Each set of data strings depicted in FIG. 8D has a start code which is represented in hexadecimal notation by a series of eight Fs. Going from left to right, the string index n for the data string is next. Following the string index n a series of time values is provided. Each time value represents a solidification source energization state event. In one example, the energization states are ON or OFF. The time values may take a variety of forms. However, in one implementation they are defined as elapsed times of a CPU clock in microcontroller unit used to operate the system for making a three-dimensional object. In one example, the CPU has a clock speed of 66 MHz and the units of time are CPU ticks. In an example where the line scanning speed is 1000 lines per second, the maximum scan length of each line in the scanning axis (y-axis direction) corresponds to 66,000 ticks. Thus, the set of string data at n=20 indicates that the solidification energy source 90 will be activated at 22000 ticks and deactivated at 44000 ticks. The set of string data at n=21 indicates that solidification energy source 90 will be activated at 20000 ticks and deactivated at 46000 ticks. In a preferred embodiment a timer is provided (such as a software timer programmed into the microcontroller unit) which is reset at the beginning of each linear scan, and the beginning of each linear scan is synchronized to the build envelope scanning axis boundary 344 using sensor 324 of FIG. 5C in the manner described previously. Thus, the ticks are defined relative to a zero starting time when the timer is reset at which point the line scanning operation is at the scanning axis boundary 344 (FIG. 8B).

In certain examples, a host computer transmits sets of data strings to a controller or microcontroller unit (e.g., controller 360 in FIG. 4) that operates the system 40 for producing a three-dimensional object. For each possible linear scan (i.e., for each string ranging from 0 to $N_{max}-1$), even though some of the sets of data strings may have no object data (e.g., no CPU tick values) associated with them because no solidification occurs at the x-axis location to which they correspond, the host computer may transmit a data string. While this technique may be used, it consumes excess microcontroller unit processor capacity involved in reading data strings corresponding to x-axis locations at which no solidification occurs. Accordingly, in certain examples, only data strings containing object solidification data (e.g., CPU tick values) are transmitted to the microcontroller unit 360. In such cases it is convenient to define a computer memory index m having values ranging from 0 to one less than the maximum number of transmitted sets of data strings $M_{max}$, where m uniquely identifies each set of string data transmitted to the microcontroller unit. In the example of FIGS. 8D, there are a total of $N_{max}$ sets of string data defined for the entire build envelope 342 by the host computer. However, only 13 sets of string data include any object solidification data. Therefore, assuming that linear solidification device 44 is moving from left to right in FIG. 8C, the first data string transmitted by the host computer to the microcontroller unit will have a computer memory index of m=0 and a string index n of 20. The value of the string index n will correspond to a specific location along the x-axis within build envelope 342 (equation 2). However, the computer memory index m will not necessarily so correspond. Thus, the microcontroller unit 360 need only read 13 data strings instead of $N_{max}-1$ data strings.

As indicated previously, the systems for making a three-dimensional object described herein may include a control unit 360, such as a microcontrol unit or microcontroller, which contains locally stored and executed programs for activating motors 74, 76, and 118 and moving build platform 42, as well as for selectively activating solidification energy source 90 and operating the level compensator 62 (FIG. 1) and vacuum pump (FIG. 4). In certain examples, the systems include a host computer that processes three-dimensional object data into a format recognized by the microcontroller unit 360 and then transmits the data to the microcontroller 360 for use by the microcontroller unit's locally stored and executed programs. As used herein, the term "microcontroller" refers to a high-performance, programmable computer memory system used for special tasks. In certain examples, the microcontrollers described herein include an integrated circuit chip having a microprocessor, a read only memory (ROM), interfaces for peripheral devices, timers, analog to digital and digital to analog converters, and possibly other functional units.

In certain examples, controller 360 selectively activates and deactivates linear solidification device 44, at least in part, based on the position of linear solidification device 44 along the travel (x) axis. The position may be directly detected or may be indirectly determined by other variables (e.g., a number of motor steps). In one implementation discussed further below, an end of travel sensor 346 (FIGS. 8B and C) is used along with a motor movement parameter to indirectly determine the travel (x) axis position.

In one implementation, controller 360 is a microcontroller that is operatively connected to solidification energy source 90 to change the energization state of solidification energy source 90 by selectively activating and deactivating it. In additional examples, the controller 360 selectively activates the solidification energy source 90, at least in part, based on shape information about the three-dimensional object being built. In further examples, the controller 360 selectively activates the solidification energy source 90 based on the position of linear solidification device 44 in the length (x-axis) direction (or based on another variable that correlates to the position such as a number of motor steps for motor 74) and based on shape information about the object being built which varies with the travel (x) axis position. On a given exposed surface 51 of solidifiable material 50, the specific x, y locations that will receive the solidification energy will be dependent on the y-axis profile of the object being built at the given x-axis location of solidification energy source 90 and rotating energy deflector 92.

Referring again to FIG. 8B, in certain implementations, linear solidification device 44 is positioned within the build envelope 342 such that the mirror 332 is located immediately proximate scanning-axis build envelope boundary 344 (unless two linear solidification devices 44a and 44b are used, in which case only one of their mirrors 332 will be so located). In such implementations, the receipt of solidification energy by sensor 324 (FIG. 5C) indicates that a line scanning operation may begin immediately thereafter because if the solidification energy source 90 remains activated and if rotating energy deflector 92 continues to rotate, solidification energy will be transmitted to the solidifiable material 50 at the scanning axis build envelope boundary 344 immediately after it is transmitted to mirror 332. Therefore, sensor 324 can be used to indicate the beginning of a line scanning operation for each facet 94(a)-94(f). As mentioned previously, when solidification energy source 90 remains activated while rotating energy deflector 92 completes a single revolution, a number of linear scanning operations will be completed in the scanning axis direction which equals the number of the rotating energy deflector's 92 facets 94(a)-(f).

In many three-dimensional object building processes, there will be several adjacent layers that are identical and which therefore can be represented by identical object layer data. Referring to FIG. 8E, object layer data is depicted in graphical form which may be used to form several layers. In certain cases it is preferable to perform line scanning operations both when linear solidification device 44 is moving from left to right and from right to left along the travel (x) axis. This presents no problem when the object is symmetrical about the mid-line of the travel (x) axis. However, when multiple identical asymmetrical layers are formed, the microcontroller unit must read the data string sets in the opposite order when the linear solidification device 44 is moving in opposite directions. For example, the table of FIG. 8F depicts multiple sets of string data which correspond to the object layer data of FIG. 8E. When moving linear solidification device 44 from left to right along the travel (x) axis, the first data string data at which solidification occurs has a string index of n=20 and a computer memory index value m of zero. The last data string at which solidification occurs has a string index of n=60. When linear solidification device 44 reverses direction to go from right to left it cannot perform the solidification starting with computer memory index m=0 and data string index n=20 because that data was defined for the left hand side of FIG. 8E, not the right hand side. Thus, performing line scanning operations based on such data would solidify a pattern that is the reverse of the desired pattern. The microcontroller unit or host computer could calculate and store full sets of data strings for the right to left direction based on the data generated for the left to right operation. However, this operation would consume excessive memory and processor capacity.

In one method of operation, the data for adjacent identical layers is inverted by the host computer and transmitted to the microcontroller unit. In accordance with the method, identical three-dimensional object layer data corresponding to first (even) and second (odd) adjacent layers of solidifiable material used to form the three-dimensional object is provided. The object layer data is subdivided into respective first and second pluralities of data strings, wherein each data string in the first plurality of object cross-section strips has a set of time values and a string index value n(even) ranging from 0 to the maximum index value of $N_{max}-1$. Each data string in the second plurality of data strings has a set of time values and a corresponding string index value n(odd), and the sets of time values in the data strings corresponding to each respective value of n(odd) for the second plurality of data strings equal the sets of time values for the first plurality of data strings which correspond to the string index value n(even) equal to $N_{max}-1$ minus the respective value of n(odd). As each odd layer is solidified, the host computer can simply identify the correct even layer data string that corresponds to each odd layer data string and transmit the even layer data string to the microcontroller, thereby avoiding the need to store a set of odd layer data strings. The use of this inversion technique allows data for multiple layers that are solidified in opposite directions to be determined by creating object layer data for only one layer and either inverting (for layers solidified in the opposite x-axis direction) it or using it (for layers solidified in the same x-axis direction) for all subsequent layers having the same cross-sectional shape.

An exemplary inversion used to reduce the storage capacity of a computer readable medium required to store three-dimensional object data corresponding to a plurality of object layers may be described as follows: A first set of object layer data is stored on a computer readable medium. The first set of object layer data comprises a first set of data strings such as those depicted in FIGS. 8D, F, and G. Each data string in the first set may be represented as d(0, m), wherein 0 indicates that the string belongs to the first set (corresponding to a particular object layer along the build (z) axis), and m is a computer memory index value unique to the string. There are $M_{max}$ values for the index m, ranging from 0 for the first data string to $M_{max}-1$ (because the first value is zero). Thus, where there are 20 total data strings with solidification data, the value of m will range from 0 to 19.

A program is stored on a computer readable medium (which may be the same or different as the one on which the first set of object layer data is stored) with instructions for calculating a second set of data strings for a second set of object layer data. The computer readable medium may be part of or separate from controller 360 (FIG. 4). The layers to which the first and second sets of object data correspond are preferably adjacent one another and define an alternating layer sequence (first set, second set, first set, second set, etc.) along the build (z) axis. The data string for the k+1 set of object layer data may be calculated using the following equation or using any set of equations such that the time values in the data strings for the k+1 set of object layer data corresponds to the time values of the data strings in the k set of object layer data in accordance with the following equation:

$$d(k+1, m(k+1))=d(k, M_{max}-1-m(k+1)) \qquad (3)$$

wherein, k is a dimensionless layer index value corresponding to a build (z) axis layer of the three-dimensional object;
m(k) is a dimensionless computer index value for layer k;
$M_{max}$ is the dimensionless maximum number of computer index m values; and
d(k, m) is a data string comprising a plurality of time values (CPU ticks).

Each data string with a computer index value m for a second layer with a layer index of k=1 may be determined from a corresponding data string from the first layer with a layer index of k=0 as follows:

$$d(1,m(1))=d(0,M_{max}-1-m(1)) \quad (4)$$

wherein, d(1,m) is the data string for layer 1 at a given value of the computer memory index, m(1) for layer k.

Equations (3) and (4) provide the time values in the data string. The string index value may be determined as follows:

$$n(k+1, m(k+1))=N_{max}-1-n(k, M_{max}-1-m(k)) \quad (5)$$

wherein, n (k, m) is the dimensionless string index value for layer k corresponding to computer index value m;
$N_{max}$ is the dimensionless maximum number of data strings per layer; and the other variables are as described previously Thus, for a second layer with a layer index value of k=1, the string index value n for a given string having computer index value m may be determined as follows:

$$n(1,m(1))=N_{max}-1-n(0, M_{max}-1-m(0)) \quad (6)$$

Using equations (4)-(6), the host computer can simply identify the data string for the $0^{th}$ layer that corresponds to each data string for the $1^{st}$ layer and transmit it to the microcontroller. Neither the host controller nor the microcontroller need store the d(1,m) strings in memory (with the correct string index value per equation (5)). As mentioned previously, each location along the x-axis direction of build envelope 342 may uniquely correspond (directly or indirectly) to a string index n. The computer memory index is used to avoid storing data strings that are empty because they correspond to locations where solidification will not take place. However, the data strings for the entire build envelope can be related to one another using equations (5) and (6).

The foregoing data inversion technique is illustrated in FIGS. 8F and G. In the example, $N_{max}$ (as may be calculated by equation (1)) is 101 and the string indices range from 0 to $N_{max}-1$ (i.e., 0 to 100). Thus, when solidifying from right to left (FIG. 8G) along the travel (x) axis, the time values comprising the data string for the odd layer having a string index of 40 (starting from n=0 at the right-hand build envelope boundary 345 in FIG. 8B) are the same as the time values comprising the data string for the even layer string having the string index n=100−40=60. Thus, the string indices are always started at zero at both the left and right hand boundaries, but the inversion of the sets of data strings by the host computer as reflected in FIGS. 8F and 8G avoids the need for recalculating new string data for the odd layer from the object data. Instead, the even layer data can simply be inverted and supplied to the microcontroller unit. In another example, the inversion process can be handled based on the computer memory index value m instead of the string index value n using equation (4). Thus, for example, when solidifying the odd layer (going from right to left) the time values in the data string for m=1 can be calculated by taking the even layer data at m=$M_{max}$−1−m(odd)=39 ($M_{max}$ is the total of computer index values, which is 41, not the maximum index value which is 40). This latter technique avoids the need to read data strings for travel (x) axis locations at which no solidification occurs and instead requires reading only those strings at which there is solidification, which by definition are those assigned a computer memory index value m.

Thus, using equations (3) and (4), for a computer index m value of 0 in layer 1, the time values comprising the data string are those time values used for a computer index value of 40 in layer 0. The string index value n for computer index value 0 in layer 1 may be calculated using equations (5) and (6) as 101−1−n(0, 41−1−0)=100−n(0, 40)=100−60=40.

As mentioned previously, in certain implementations of the systems described herein a motor movement parameter such as a number of motor steps is used to indirectly indicate when the linear solidification device 44 is at an x-axis location corresponding to a particular linear scan or string data index, n. For a desired string index value, n, the number of steps from the relevant build envelope travel (x) axis boundary, 343 or 345, can be calculated using the following formula:

$$\text{Steps}=W(S)(n)(RPM)(F)/60 \quad (7)$$

wherein, Steps is the number of motor steps from the build envelope x-axis boundary to the location at which the line scan having the index value n is performed;
W is a ratio of motor steps for motor 74 per unit length in the x-axis direction in steps/mm;
S is the speed of the motor 74 as converted to a rate of travel along the travel (x) axis (mm/sec);
RPM is the rotational frequency of the rotating energy deflector in revolutions per minute; and
F is the number of facets on the rotating energy deflector.

The variable W can itself be considered a "motor movement parameter" since it depends on a number of motor steps. As indicated previously, W can be estimated from known mechanical relationships between the rotational speed and gear ratio of motor 74 and the pulley diameters 85a and 85b. One method of estimating W is to determine the number of estimated steps required to traverse the travel (x) axis length L of build envelope 342 based on such known mechanical relationships. However, due to gear backlash, thermal effects and other non-idealities, the estimated value of W may not be accurate. In cases where solidification is performed bi-directionally with respect to the x-axis (starting from the build envelope boundaries 343 and 345), the error in W can cause misalignment between odd and even layers because the calculated number of steps will not correspond to the desired x-axis location believed to correspond to the value of n used in equation (7). For example, if a build process is started from the left to right direction along the x-axis direction, and W is too high, a given value of n will cause solidification to occur farther to the right than desired. As a result, the right-most boundary of the part will be farther to the right than desired. If solidification is then reversed (right to left), the number of steps corresponding to a given value of n will be shifted farther to the left than desired. Thus, when the resulting part is viewed from the same orientation as the one in which it was built (i.e., with the side that was the left side during formation positioned to the left of the side that was the right side during formation), the portions of the part that were solidified in the left to right direction will have a right hand border that is shifted to the right relative to the portions of the part that were solidified in the left to right direction. The left hand border of the portions of the part solidified in the right to left direction will be shifted to the left relative to those solidified in the left to right direction. Conversely, if solidification starts from left to right and W is too low, when viewing the resulting part in the same orientation as the one in which it was built, the right-hand border of the portions solidified in the left to right direction will be shifted to the left relative to the portions solidified in the right to left direction, and the left-hand border of the portion solidified in the left to right direction will be shifted to when solidifying from right.

As a result, in certain implementations it is desirable to adjust the motor movement parameter (e.g., W) based on test part measurement data. The test part measurement data may comprise the length of an offset dimension or gap between two or more sections of the test part. The measured offset dimension or gap constitutes an observed degree of gear backlash, or an observed degree of gear backlash combined with other factors that contribute to errors in W. In certain cases where the data inversion method illustrated in FIGS. 8F and G is used, an offset is created between those sections of identical layers which are solidified in opposite directions along the x-axis. The offset is then used to adjust the value of W.

Figure 9A:
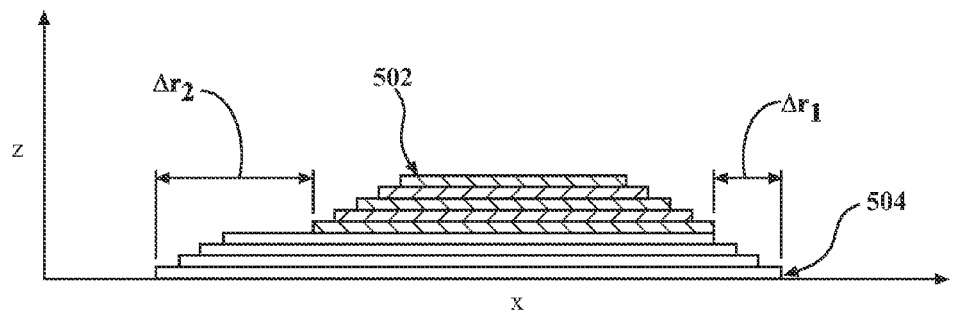
FIG. 9A is a view along the scanning (y) axis of a hemispherical test part used to adjust a motor movement parameter in a system for making a three-dimensional object from a solidifiable material in a closed housing configuration.
Figure 9B:
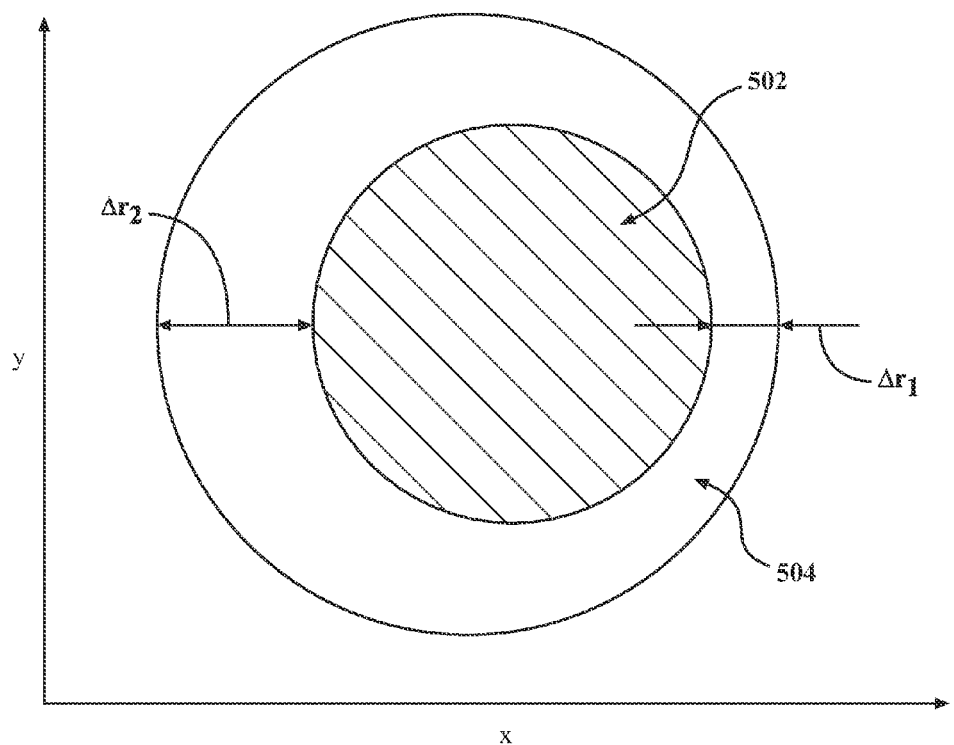
FIG. 9B is a view along the build (z) axis of the test part of FIG. 9A.
Figure 10A:
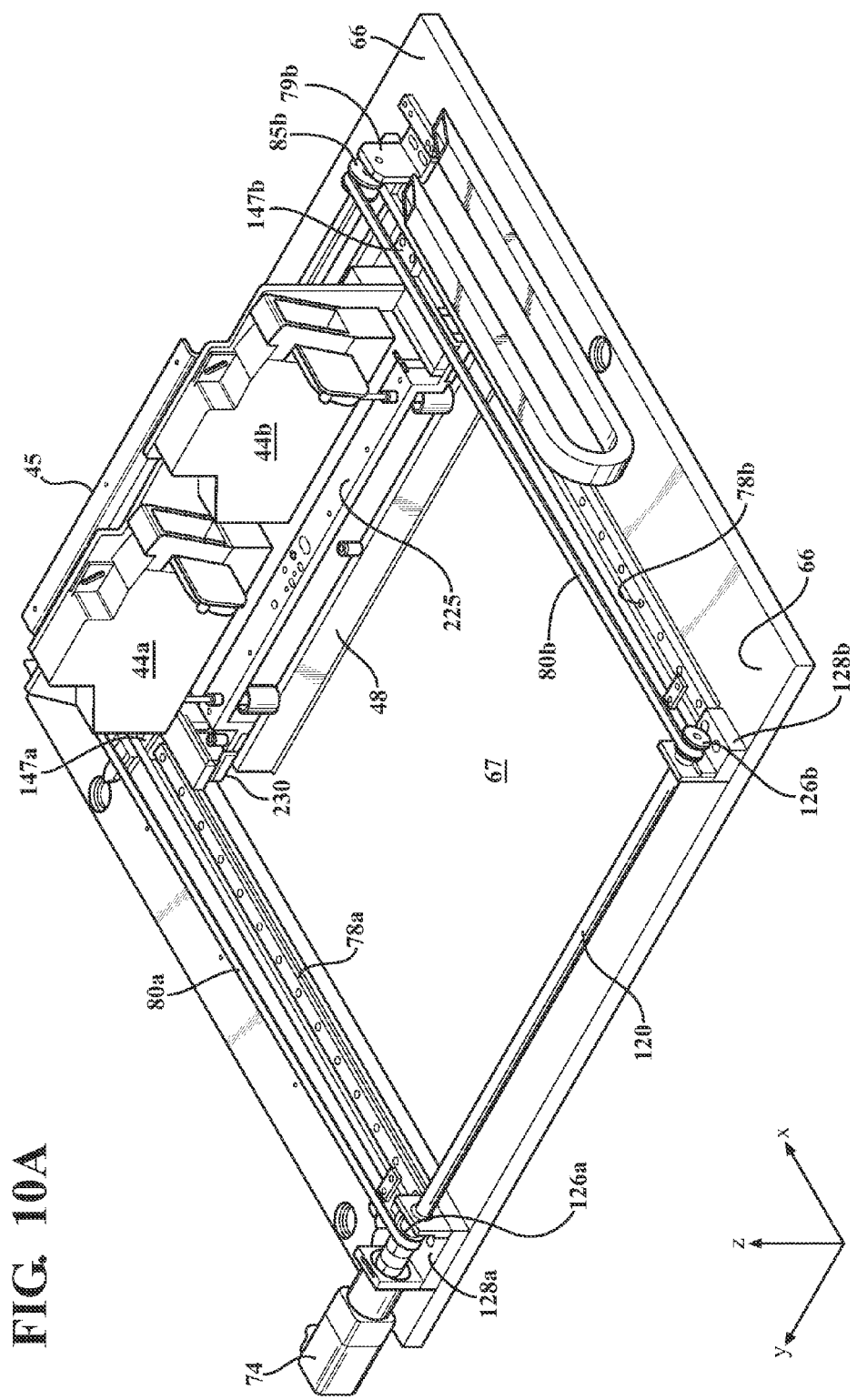
FIG. 10A is a first perspective view of the upper side an alternate solidification assembly in which a vacuum blade is engageable with mechanical stops to reposition the blade relative to linear solidification devices.
Figure 10B:
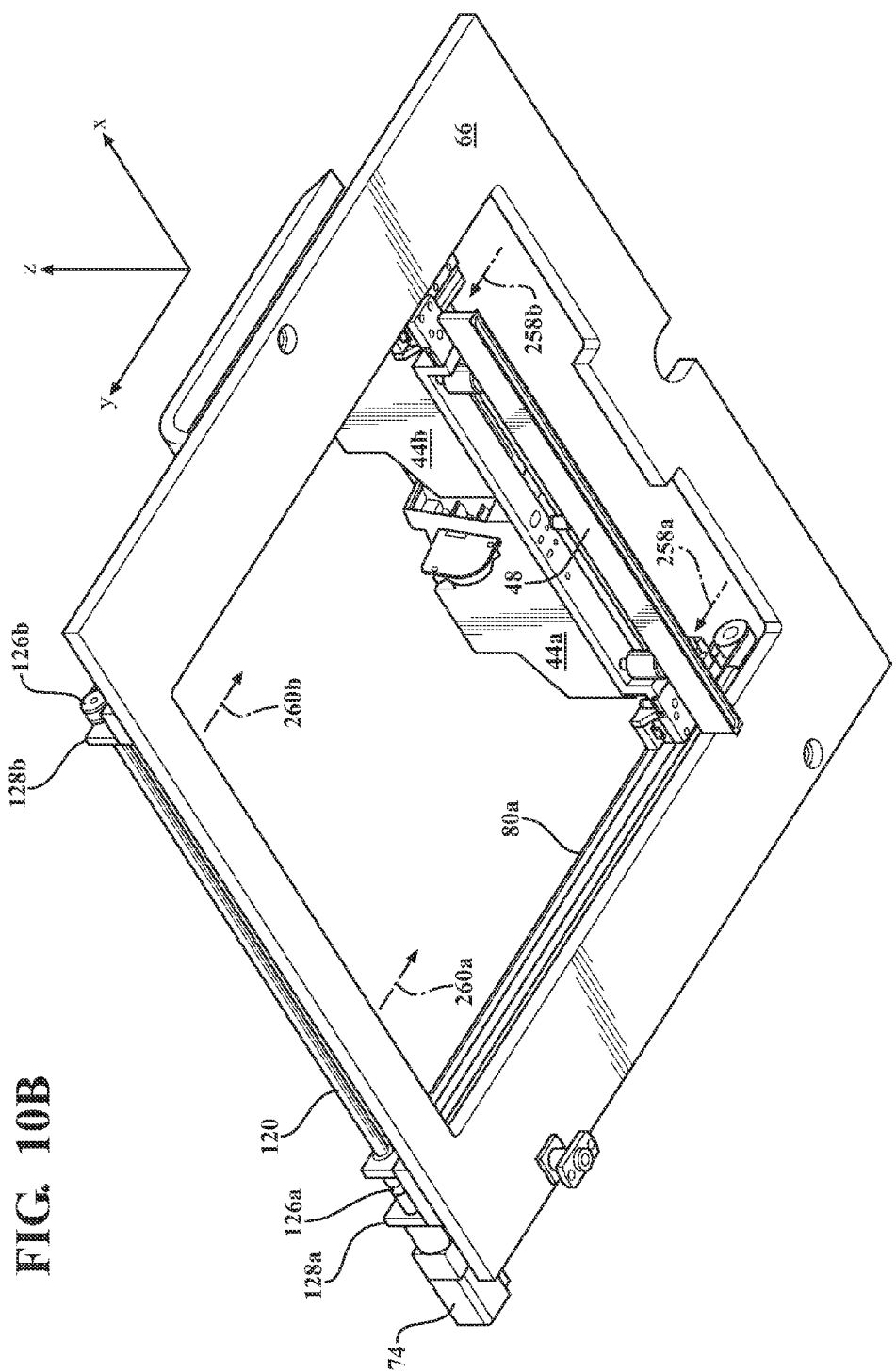
FIG. 10B is a second perspective view of the lower side of the solidification assembly of FIG. 10A.
Figure 10C:
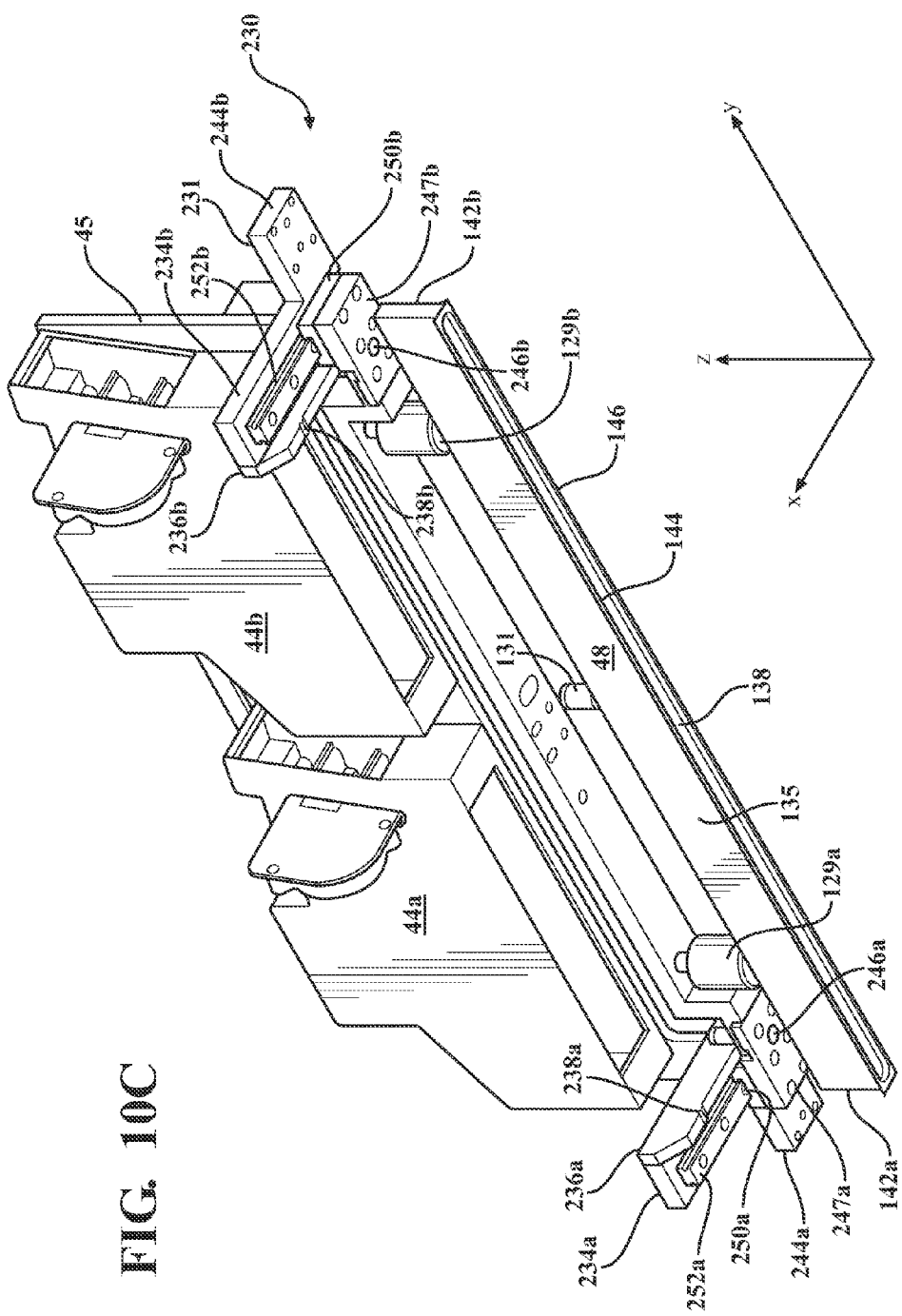
FIG. 10C is a perspective view of the linear solidification devices, vacuum blade, and blade positioning assembly of FIG. 10A.
Figure 10D:
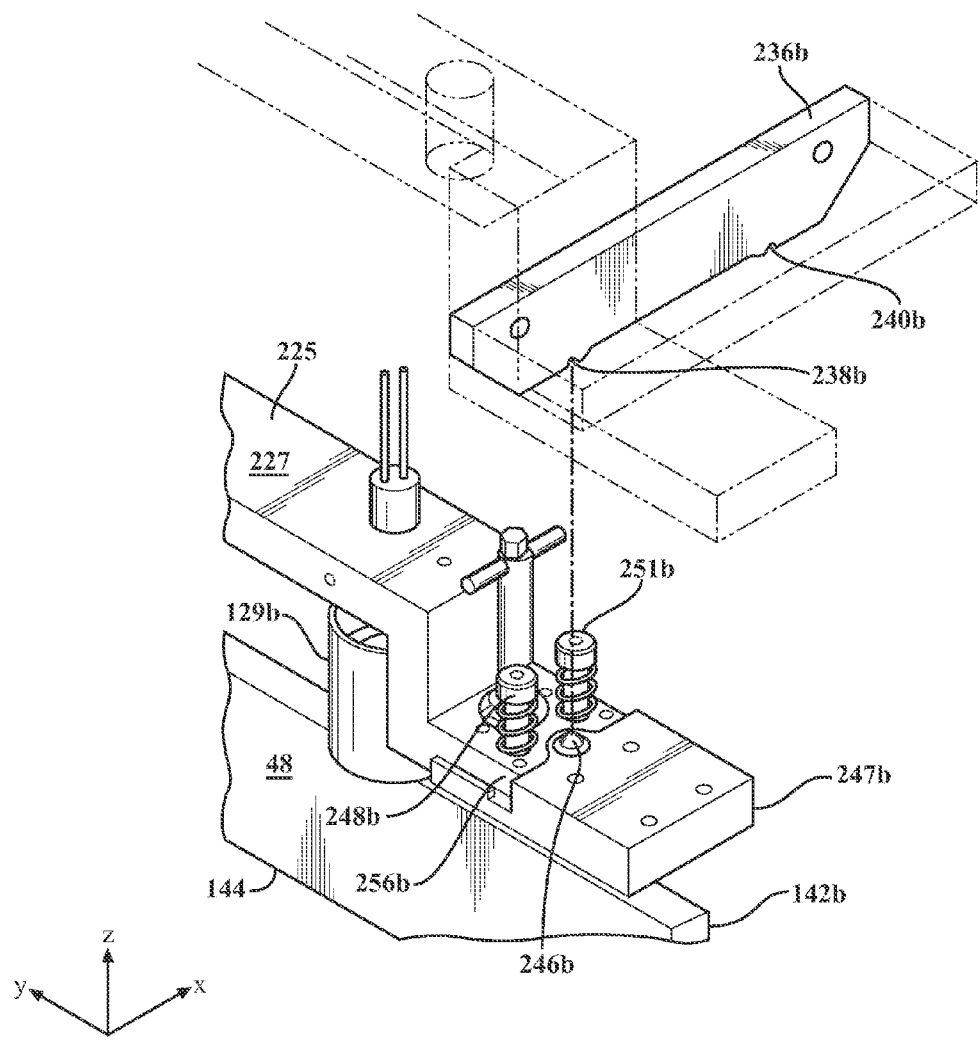
FIG. 10D is a first perspective close-up view of a portion of the vacuum blade and blade support of FIG. 10A in a first position relative to an indexing plate.
Figure 10E:
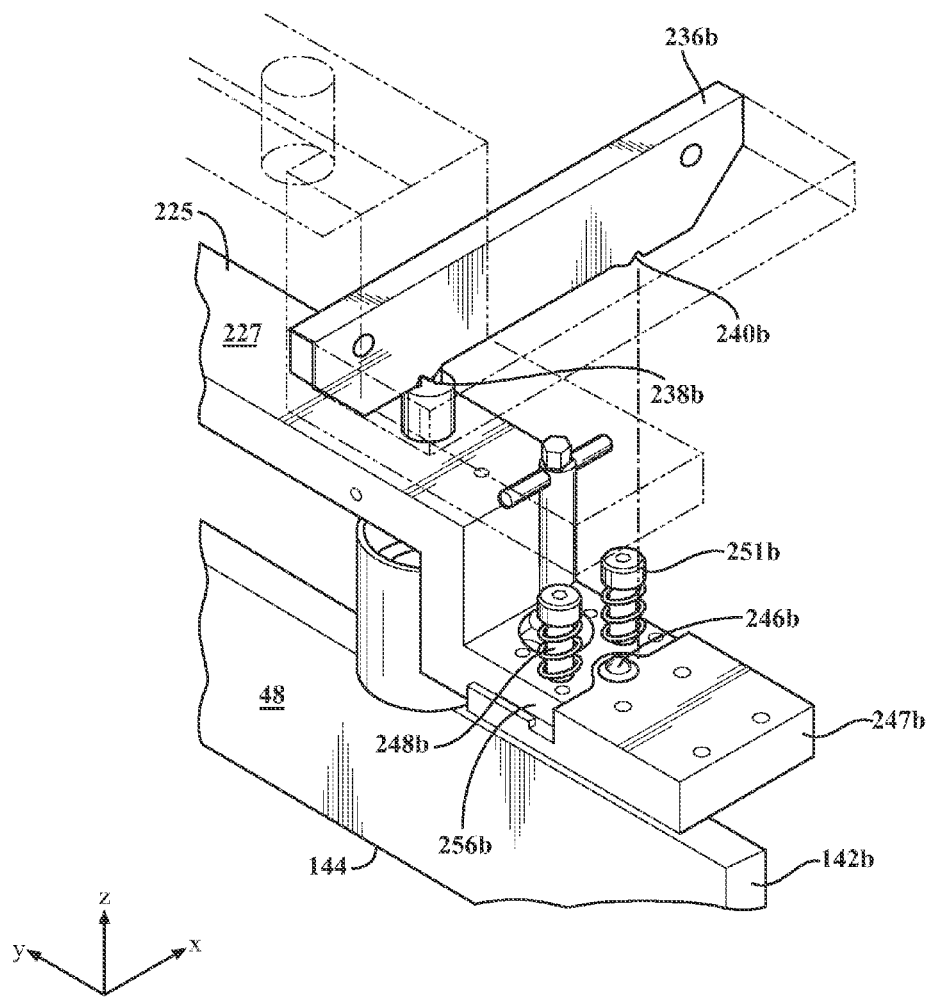
FIG. 10E is a second perspective close-up view of a portion of the vacuum blade and blade support of FIG. 10A is a second position relative to an indexing plate.

One method of preparing a test part for use in determining the adjustment of the motor movement comprises forming a first series of layers of the test part by moving linear solidification device 44 in a first direction along the x-axis (e.g., left-to-right) and performing linear scan operations in the scanning axis (y-axis) direction. A second series of layers is then formed by moving linear solidification device 44 in an x-axis direction opposite the one used to form the first set of layers (e.g., right-to-left) and performing linear scan operations in the scanning axis (y-axis) direction. The test part may have a variety shapes, but in certain examples a simple rectangular block shape is used. In other examples, and as illustrated in FIGS. 9A and 9B, a hemispherical test part shape is used. In the formation of the test part, an initial value of the motor movement parameter is specified which is believed to yield the correct build envelope 342 length in the x-axis direction. In one preferred example, the motor movement parameter is a number of motor steps for motor 76 that is estimated to correspond to the known length L of build envelope 342. From this data, a predicted value of W can be calculated.

As indicated by equation (7), if the motor movement parameter is in error, the predicted value of W will also be in error, which in turn will cause the number of motor steps (Steps) calculated from equation (7) to be in error. The effects of such an error in W can be exemplified by referring again to the data of FIG. 8F. If a test part is built using that data, the first series of layers will all use the data of FIG. 8F and will be formed in the left to right direction along the x-axis. The second series of layers will be formed in the right to left direction along the x-axis. As the data indicates, for the left to right layers, the first linear scan going from the left to right direction will be performed at string index value n of 20. If the predicted value of W is greater than the actual value, the first linear scan will be offset farther to the right from the left hand build envelope boundary 343 than desired, as will all of the subsequent linear scans. As a result, all of the left to right (even) layers will be shifted to the right relative to the desired position. When solidification direction is reversed and the data of FIG. 8G is used, the first string at m=0, n=40 will be offset farther to the left from the right-hand build envelope boundary 345 than desired. Thus, when the test part is complete and viewed from the same orientation as its build orientation, the first set of layers formed in the left to right direction will be shifted to the right relative to the second set of layers formed in the right to left direction. The shift will produce a measurable offset dimension.

The test part's measured offset dimension can then be used to correct the value of W used by the microcontroller in accordance with equations (8)-(10):

$$\text{Step Offset} = \Delta L * W \tag{8}$$

$$\text{Corrected Build Envelope Length in Steps} = \text{Steps (Predicted)} + \text{Step Offset} \tag{9}$$

$$W_{corrected} = \text{Corrected Build Envelope Length in Steps}/L \tag{10}$$

wherein, ΔL is the measured offset dimension (mm) between the first and second sets of test part layers, and a positive value of ΔL indicates that the left to right layers are offset to the left relative to the right to left layers, while a negative value of ΔL indicates that the right to left layers are offset to the right relative to the right to left layers;

W is the original, predicted value of W (steps/mm);

L is the build envelope length (mm);

Steps (Predicted) is the original number of steps predicted to correspond to build envelope length L based on motor rotation frequency, gear ratio, and pulley diameter, which equals W*L, where L is the build envelope length in mm; and $W_{corrected}$ is the corrected value of W The value of $W_{corrected}$ can then be used with equation (7) in subsequent part building processes. The foregoing relationships can be generalized with respect to the build directions as follows: If solidification occurs in a first series of layers in a first direction and a second series of layers in a second direction (opposite the first direction), when viewing the part in an orientation (the viewing orientation) that is the same as the one in which it was built (the formation orientation) a value of W that is too low will cause the first set of layers to be shifted in the second direction relative to the first set of layers, and the value of ΔL used in equation (8) will be positive. Conversely, if the value of W is too high, the first set of layers will be offset in the first direction relative to the second set of layers, and the value of ΔL in equation (8) will be negative.

The relationship between the "viewing orientation" and the "formation orientation" can best be understood with an example. Each layer will be solidified by forming a series of linearly cured sections starting from a build envelope origin and ending at a build envelope terminal point. A formation orientation can be selected by selecting an arbitrary coordinate system which will then define a direction going from the origin to the terminal point, such as the "positive x-axis direction" or "left to right." The "viewing orientation" used to measure the offset ΔL should then be the same as the formation orientation, such that when viewing the object the portion of the solidified object at which solidification began (the origin) has the same directional relationship to the portion of the solidified object at which solidification ended (the terminal point).

In certain examples, ΔL is measured using a caliper with a minimum measurement capability of 50 microns. In such cases, offset values ΔL of less than 50 microns cannot be measured, and layers formed in one direction may be offset from those formed in the other direction by up to 50 microns. In some cases, it may be desirable to increase the accuracy of the part building process by measuring smaller offset values ΔL and adjusting a motor movement parameter (e.g., W) accordingly. One method suitable for this purpose will now be described with reference to FIGS. 9A and 9B. In accordance with the technique, a generally hemispherical test part is built. A first set of layers 504 is formed by solidifying the resin only when linear solidification device 44 moves in a first (positive) direction along the travel (x) axis (FIG. 9B). A second set of layers 502 is then formed by solidifying the resin only when linear solidification device 44 moves in a second (negative) direction opposite the one used to form the first set of layers 504. In FIG. 9A, the layers 502 and 504 are viewed by looking in a direction perpendicular to the x-z plane (i.e., along the scanning or y-axis).

In accordance with the method, the completed test part is then placed under a microscope and viewed along the z (height) axis such that the points of origin of the layers are in the same relative positions along the x-axis as during the formation process (i.e., the points of origin of section 502 are farther out in the positive x-axis direction than the points of origin of section 504). Two circular sections 502 and 504 will be visible. If the motor movement parameter W is in error, the inner circle 502 will not be concentric with the outer circle 504, although their diameters parallel to the x-axis should be substantially co-linear. In such cases, two offsets, $\Delta r_1$ and $\Delta r_2$, may be measured between the x-axis extremes of each circular section 502 and 504. As shown in FIG. 9B, the x-axis location of section 502 that is farthest from the scanning (y) axis may be subtracted from the x-axis location of section 504 that is farthest from the scanning (y) axis to yield $\Delta r_1$. The x-axis location of section 504 that is closest to the y-axis may be subtracted from the x-axis location of section 502 that is closest to the y-axis to yield $\Delta r_2$. If the motor movement parameter is correctly set, the value of $\Delta r_1 - \Delta r_2$ will be zero (or substantially zero). However, if the motor movement parameter is incorrectly set, $\Delta r_1 - \Delta r_2$ will be non-zero. As mentioned above, in the example of FIGS. 9A and 9B section 504 is formed only while linear solidification device 44 moves in the positive x-axis direction, and section 502 is formed only while linear solidification device 44 moves in the negative x-axis direction. The negative value of $\Delta r_1 - \Delta r_2$ indicates that the motor movement parameter (e.g., W) was set too low. Thus, by building additional test parts with increased values of W, the correct value (the one that yields $\Delta r_1 = \Delta r_2$) can be determined and input into the microcontroller for actual (non-testing) part builds. Equations (8)-(10) may be used to calculate a corrected value of the motor movement parameter ($W_{corrected}$) by substituting $\Delta r_1 - \Delta r_2$ for $\Delta L$.

Referring again to FIG. 5C, embodiments of a method for synchronizing a timer to the position of a scan line within the build envelope 342 will now be described. The method comprises activating a solidification energy source, such as source 90, which is in optical communication with a scanning device, such as a rotating energy deflector 92 or a linear scanning micromirror. The scanning device deflects solidification energy received from solidification energy source 90, and the deflected solidification energy is received by a solidification energy sensor, such as sensor 324. In certain examples, a mirror such as mirror 332 is provided to facilitate the transmission of deflected solidification energy from the scanning device to sensor 324.

In accordance with the method, the solidification energy sensor senses the receipt of solidification energy and generates a sensing signal that is transmitted to a system microcontroller. The sensor's receipt of the solidification energy corresponds to the beginning of a line scanning operation. A timer is then initialized to a specified value (e.g., zero) based on the receipt of solidification energy by the sensor.

In some cases involving large build envelopes, a single linear solidification device 44 may be incapable of delivering a sufficient solidification energy density to solidify a three-dimensional object in a desired amount of time. As the build envelope size increases in the scanning (y) axis direction, the scanning speed will have to increase in order to maintain the same overall build speed. However, as the scanning speed increases, each portion of the solidifiable material that receives solidification energy during a given scan is exposed for less time, resulting in a decreased solidification energy. As a result, it may be difficult or impossible in some cases to achieve the desired solidification depth in the build (z) axis direction without significantly increasing the overall build time. As a result, in some cases, especially those involving large build envelopes, it is desirable to use multiple linear solidification devices arranged along the scanning (y) axis direction. Thus, in the example of FIGS. 2A-2C, two linear solidification devices 44a and 44b are used.

While the linear solidification devices 44a and 44b are spaced apart from one another along the scanning (y) axis direction, they are preferably configured to deliver solidification energy to an overlap region along the scanning axis to ensure that there are no gaps or deadspaces along the scanning (y) axis that cannot be exposed to solidification energy. Solidification energy may be delivered from each device 44a and 44b at an angle relative to the x-y plane so that the highest position that device 44b can deliver energy to along the y-axis is higher than the lowest position that the device 44a can deliver energy to along the y-axis. In one example, device 44b may be capable of delivering solidification energy from the beginning of the build envelope (in the scanning axis direction) to a maximum position 20 mm away from the beginning of the build envelope, while device 44a may be capable of delivering solidification energy from a minimum position 18 mm away from the beginning of the build envelope to the end of the build envelope (in the scanning axis direction), yielding a 2 mm overlap region. The desired degree of overlap may be achieved by appropriately selecting the spacing between the linear solidification devices 44a and 44b, as well as their linear openings 100 (FIG. 5B), and ensuring that the various lenses and other optical components are appropriately selected.

As indicated above, in many cases, the linear solidification devices 44a and 44b will solidify a common overlap region to ensure continuity of solidification. To prevent gaps from occurring the object data strings used to guide the solidification process may be modified for use with multiple linear solidification devices. Suitable data strings are shown in FIG. 30-32 of U.S. patent application Ser. No. 13/774,355.

In the example of FIGS. 2A-2C, the linear solidification devices 44a and 44b are configured to move along the travel (x) axis independently of the vacuum blade 48. The linear solidification devices 44a and 44b have their own dedicated translation assembly 70, and the vacuum blade 48 has its own dedicated blade translation assembly 72. In accordance with a fourth aspect of the present disclosure, an apparatus is provided which comprises a linear solidification device that scans solidification energy along a scanning axis while traveling a long a travel axis, a blade connected to the linear solidification device such that when the linear solidification device travels along the travel axis, the blade travels along the travel axis while remaining spaced apart from the linear solidification device by a fixed distance along the travel axis, and a blade engagement surface, wherein when the blade engagement surface applies a force to the blade, the blade moves relative to the linear solidification device along the travel axis. An illustrative example of the foregoing apparatus is shown in FIGS. 10A-10E. Like numerals refer to like parts in the apparatuses of FIGS. 2A-2C and 10A-10E. In FIGS. 10A-10E, a translation assembly comprising motor 74, rails 78a and 78b and timing belts 80a and 80b is provided to translate both the linear solidification devices 44a and 44b and the vacuum blade 48 along the travel (x)

axis. The translation assembly is substantially the same as the linear solidification device translation assembly 70 of FIGS. 2A-2C.

As the linear solidification devices 44a and 44b travel in a first direction along the travel (x) axis, the blade 48 also travels in the first direction along the travel (x) axis while remaining spaced apart from the linear solidification devices in the first direction (i.e., leading the linear solidification devices 44a and 44b) by a fixed travel (x) axis offset. The spacing between the linear openings 100 of the linear solidification devices 44a and 44b and the blade 48 along the travel (x) axis is preferably at least one (1) inch. Other than traveling in this manner, the blade 48 operates in the same manner as described previously and as shown in particular in FIG. 3B. In this example, the vacuum blade is in a leading offset as the linear solidification devices 44a and 44b travel along the travel (x) axis. If bi-directional solidification (i.e., in both directions along the travel (x) axis) is desired, a mechanism for reversing the travel (x) axis relative orientations of the linear solidification devices 44a and 44b and the vacuum blade 48 is required when the linear solidification devices 44a and 44b change their direction of travel along the travel (x) axis. A vacuum blade positioning assembly 230 (FIG. 10C) is provided for this purpose. The vacuum blade positioning assembly 230 comprises a base 231 that is attached to the underside of the linear solidification devices 44a, 44b (preferably to their respective housings 96 or suitable connection devices attached thereto). The base 231 is a generally elongated member with a middle cross-beam 232 and two slide rail mounting sections 234a and 234b that project in the same direction away from the middle cross-beam along the travel (x) axis direction and which are spaced apart from one another along the scanning (y) axis. Each slide rail mounting section 234a and 234b has a lower surface on which a corresponding slide rail 252a and 252b is mounted. Base 231 also includes linear bearing attachment sections 244a and 244b which project away from one another along the scanning (y) axis. Linear bearings 147a and 147b (FIG. 2A) are attached to the undersides of linear bearing attachment sections 244a and 244b as are the timing belts 80a and 80b.

Vacuum blade positioning assembly 230 also comprises blade support 225 which is a generally elongated member having a middle cross-beam 227 and two linear bearing attachment sections 247a and 247b which project away from one another along the scanning (y) axis and which are positioned between the blade 48 and the cross-beam 227 along the build (z) axis. The linear bearing attachment sections 244a and 244b are attached to connection sections 256a (not shown) and 256b (FIGS. 10D and 10E) which are integrally formed with cross-beam 227 in to a single structure. Spring connectors 248a, 250a (not shown) and 248b, 250b (FIGS. 10D and 10E) connect the connection sections 256a (not shown) and 256b to their respective linear bearing attachment sections 244a and 244b. Spring plungers 246a (not shown) and 246b are depressible below the upward-facing surface of the linear bearing attachment sections 247a and 247b. The spring plungers 246a and 246b engage detents 238a, 240a and 238b and 240b formed on indexing plates 236a and 236b to releasably lock the travel (x) axis position of blade 48 relative to the linear solidification devices 44a and 44b along the travel (x) axis.

Linear bearings 250a and 250b are attached to linear bearing attachment sections 247a and 247b of blade support 225 and slidably engage a corresponding one of rails 252a and 252b mounted on the underside of the slide rail mounting sections 234a and 234b provided on base 231. When the spring plungers 246a and 246b are disengaged from their respective sets of detents (detents 238a and 240a for spring plunger 246a and detents 238b and 240b for spring plunger 246b), linear bearings 250a and 250b slide along their respective rails 252a and 252b, thereby allowing relative motion between the vacuum blade 48 and the linear solidification devices 44a and 44b along the travel (x) axis. The blade support 225 moves with linear bearings 250a and 250b along the travel (x) axis relative to the cross-beam beam 232 of base 231 and relative to the linear solidification devices 44a and 44b. When spring plungers 246a and 246b respectively engage detents 238a and 238b, the vacuum blade 48 is spaced apart from the linear solidification devices 44a and 44b in a first direction along the travel (x) axis. When spring plungers 246a and 246b respectively engage detents 240a and 240b, the vacuum blade is spaced apart from the linear solidification devices 44a and 44b in a second direction along the travel (x) axis which is opposite the first direction. The linear distance between detents 238a and 240a (as well as between detents 238b and 240b) is twice the offset distance between the vacuum blade 48 and the linear solidification devices 44a, 44b during an object solidification operation in which the linear solidification devices travel along the travel (x) axis while selectively scanning solidification energy along the scanning (y) axis.

Engagement surfaces are affixed to linear solidification device table 66 to apply a force to the blade support 225 (and therefore, also to blade 48 by virtue of its connection to blade support 225) that causes the indexing plates 236a and 236b to apply a depressing force to spring plungers 246a and 246b so that they disengage with which ever pair of detents (238a, 238b or 240a, 240b) they are currently engaged. The vacuum blade support member 225 then continues to move along the travel (x) axis as linear bearings 250a and 250b slide along linear rails 252a and 252b until the spring plungers 246a and 246b reach the next set of detents, at which point the spring plungers 246a and 246b release and engage the detents.

The engagement surfaces may be configured as hard rubber, metal, or plastic projections 258a, 258b, 260a, and 260b (FIG. 10B) and preferably engage a portion of blade support member 225 to disengage the spring plungers 246a and 246b from one of the pairs of detents 238a, 238b or 240a, 240b. The vacuum blade 48 is preferably positioned so that its upper surface 134 (FIGS. 3A, 3B) is beneath the lower surface of the linear solidification device table 66. The linear solidification devices 44a and 44b and the slide rail mounting sections 234a and 235b of base 231 are preferably positioned above the linear solidification device table 66 also.

A method of using the apparatus of FIGS. 10A-10E will now be described. In accordance with the method, starting from the linear solidification device 44a, 44b position of FIG. 10A, an object layer solidification operation is commenced by energizing motor 74 to cause shaft 120 to rotate in a first direction about its longitudinal axis. The rotation of shaft 120 causes pulleys 126a and 126b to rotate in a first rotational direction, which causes timing belts 80a and 80b to circulate in a first circulation direction and pulleys 85a (not shown in FIG. 10A) and 85b to rotate in a first rotation direction. Because they are attached to timing belts 80a and 80b, linear bearings 147a and 147b begin to slide along rails 78a and 78b in a first direction along the travel (x) axis toward shaft 120. Controller 360 (FIG. 4) will energize the rotating polygonal mirror motor 118 (FIG. 5A) and will selectively activate the solidification energy sources 90 in each linear solidification device 44a, 44b to selectively scan solidification energy along the exposed surface 51 of solidifiable material 50 as the linear solidification devices 44a and 44b travel along the travel (x) axis.

Vacuum blade 48 is spaced apart from the linear solidification devices 44a and 44b by an offset distance in the first direction along the travel (x) axis that is defined by the engagement of spring plungers 246a and 246b with respective index plate detents 238a and 238b. The engagement of spring plungers 246a and 246b with detents 238a and 238b releasably locks the position of the linear solidification devices 44a and 44b relative to vacuum blade 48 along the travel (x) axis. The offset is preferably at least one (1) inch.

Once the linear solidification devices 44a and 44b near their end of travel position (proximate shaft 120), hard stops 260a and 260b (FIGS. 10B) will engage surfaces of the blade support member 225, causing the spring plungers 246a and 246b to disengage from detents 238a and 238b. Solidification of the solidifiable material 50 has preferably stopped at this point. As the linear solidification devices 44a and 44b continue to move in the first direction along the travel (x) axis, the now disengaged blade support member 225 will slide in the second direction along the travel (x) axis relative to the linear solidification devices 44a and 44b as linear bearings 250a and 250b slide along linear rails 252a and 252b until the spring plungers 246a and 246breach detents 240a and 240b at which point the spring plungers 246a and 246b will snap into engagement with detents 240a and 240b. At this point, the vacuum blade 48 is releasably locked into position and offset in the second direction along the travel (x) axis relative to the linear solidification devices 44a, 44b.

Motor 74 will then reverse direction, causing shaft 120 to rotate in a second direction about its longitudinal axis, causing pulleys 126a and 126b to rotate in a second direction, and timing belts 80a and 80b to circulate in a second direction. Linear bearings 147a and 147b will then be pulled in the second direction along the travel (x) axis, causing the base 231 and linear solidification devices 44a and 44b to travel therewith. As the linear solidification devices 44a and 44b travel along the travel (x) axis in the second direction, their solidification energy sources 90 are selectively activated (while the polygonal mirrors 92 rotate) to selectively scan solidification energy along the exposed surface 51 of solidifiable material 50. When the linear solidification devices 44a, 44b near their end of travel in the second direction along the travel (x) axis, hard stops 258a and 258b will engage blade support member 225, disengaging the spring plungers 246a and 246b from detents 240a and 240b. Continued movement of the linear solidification devices 44a and 44b along the travel (x) axis will cause the hard stops 258a and 258b to displace the blade support member 225 relative to the base 231 and linear solidification devices 44a and 44b until the spring plungers 246a and 246b reach and engage detents 238a and 238b. The process then repeats itself until the object is complete.

Figure 11:
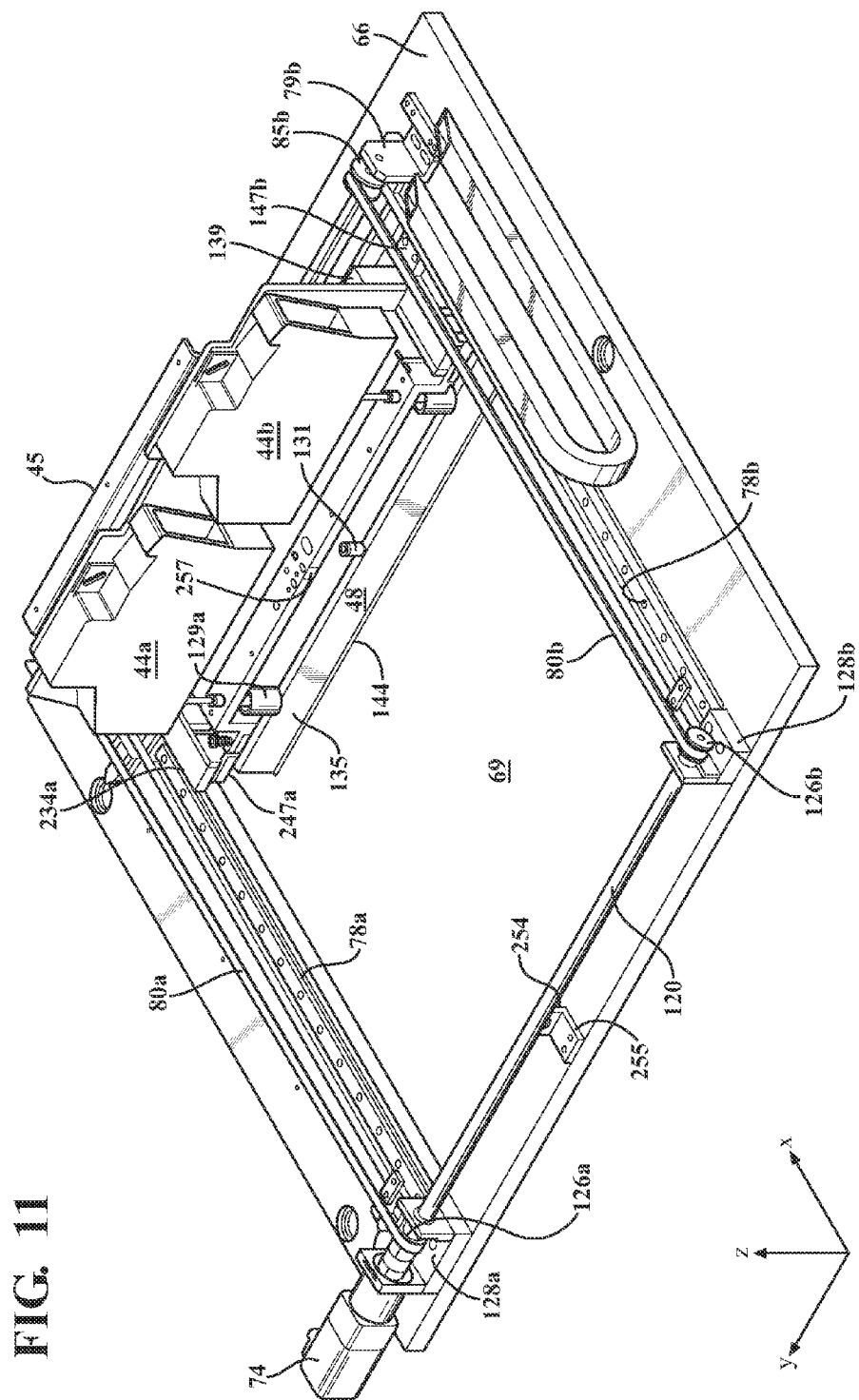
FIG. 11 is a perspective view of a modified version of the solidification assembly of FIG. 10A comprising a releasable magnetic lock.

A modified version of the solidification assembly 41 of FIGS. 10A-10E is shown in FIG. 11. Like numerals refer to like parts. The solidification assembly 41 of FIG. 11 is the same in all respects as the solidification assembly 41 of FIGS. 10A-10E except that in FIG. 11 the hard stops 258a, 258b, 260a, and 260b are not used. Instead, releasable magnetic locks are provided. Each magnetic lock comprises a first magnet and a second permanent magnet (having an opposite polarity to the first magnet) or a ferromagnetic surface that is attractable to the first magnet. The magnets may be permanent magnets or selectively energizable electromagnets. In FIG. 11, the first releasable magnetic lock comprises a first permanent magnet 254 and a first ferromagnetic surface 257 mounted on blade support 225. First permanent magnet 254 is mounted in a bracket 255 at one end of the linear solidification device table 66 and acts as an engagement surface that applies a magnetic force to ferromagnetic surface 257 of blade support 225, and by extension to blade 48, which is attached to blade support 225. The first permanent magnet 254 is capable of exerting an attractive magnetic force upon first ferromagnetic surface 257 when the first permanent magnet 254 and first ferromagnetic surface 257 come into close proximity or contact with one another. A second permanent magnet (not shown) is attached to an opposite end of the linear solidification device table 66 in a similar fashion, and a second ferromagnetic surface (not shown) is mounted on an side of the vacuum blade support member 225 opposite the side to which the first ferromagnetic surface 257 is mounted. In the example of FIG. 11, as the linear solidification devices 44a and 44b travel in a first direction along the travel (x) axis during a solidification operation, the vacuum blade 48 is spaced apart from the linear solidification devices 44a and 44b in the second direction by a fixed offset distance. Thus, the vacuum blade 48 trails the linear solidification devices 44a and 44b during an object solidification operation. In FIG. 11, the linear solidification devices 44a and 44b are moving along the travel (x) axis in a first direction toward motor 74 and away from pulleys 85a (not shown) and 85b. During the traversal of the first and second linear solidification devices 44a and 44b in the first direction along the travel (x) axis, the spring plungers 246a (not shown) and 246b are engaged with detents 240a and 240b (FIGS. 10C-E and 11).

The linear solidification devices 44a and 44b will continue traveling in the first direction until the first permanent magnet 254 engages first ferromagnetic surface 257, which will releasably lock the blade support 225 to the first permanent magnet 254. The motor 74 will then be operated to reverse the direction of rotation of shaft 120, which will pull the linear bearings 147a (not shown in FIGS. 11) and 147b in a second direction along the travel (x) axis, away from the motor 74. The movement of the linear bearings 147a and 147b and the base 231 will cause the base 231 to move in the second direction along the travel (x) axis relative to the blade support 225 as the rails 252a and 252b slide relative to linear bearings 250a and 250b (FIG. 10C), which will disengage spring plungers 246a and 246b from detents 240a and 240b. As the linear bearings 147a and 147b continue to move in the second direction along the travel (x) axis, the detents 238a and 238b will eventually engage the spring plungers 246a and 246b. At this point, the blade 48 will be spaced apart from the linear solidification devices 44a, 44b in the first direction along the travel (x) axis (i.e., the vacuum blade 48 will trail the linear solidification devices) by the fixed offset amount. With the vacuum blade 48 now locked into place relative to the linear solidification devices 44a and 44b, further movement of the linear solidification devices 44a and 44b in the second direction along the travel (x) axis will exert a pulling force on blade support 225 which will overcome the oppositely directed magnetic force exerted by first permanent magnet 254 against first ferromagnetic surface 257, which will release the vacuum blade 48 from the releasable lock defined by the first permanent magnet 254 and the first ferromagnetic surface 257, allowing the first and second linear solidification devices 44a and 44b to travel in the second direction along the travel (x) axis with the vacuum blade 48 trailing by the fixed offset distance. The process repeats itself when a ferromagnetic surface on the side of the blade support 225 opposite the side on which the first ferromagnetic surface 257 is mounted engages a second permanent magnet on the end of the linear solidification device table 66 opposite the end the permanent magnet 254 is mounted. Thus, the releasable magnetic locks of FIG. 11 provide a means for traversing the linear solidification devices 44a and 44b along the travel (x) axis with the vacuum blade 48 trailing by a fixed offset amount instead of leading by a fixed offset amount as in the case of FIGS. 10A-10E.

In accordance with a fifth aspect of the present disclosure, an apparatus for making a three-dimensional object is provided which comprises a linear solidification device, a linear solidification device translation assembly, a vacuum blade, and a hydraulic (liquid fluid), pneumatic (air or other gas fluid) or electric repositioning assembly for adjusting the relative offset between the vacuum blade and the linear solidification along the travel axis. An example of such an apparatus is provided in FIGS. 12A-B. Solidification assembly 41 is similar to that of FIGS. 10A-E and like parts refer to like numerals. However, pneumatic cylinder assembly 259 is provided for repositioning vacuum blade 48 and blade support 225 along the travel (x) axis relative to linear solidification devices 44a and 44b. Linear solidification device cover plate 45 is attached by suitable fasteners to base 231, which is attached to linear bearings 147a and 147b, as described previously. Thus, when motor 74 (not shown in FIGS. 12A and 12B) is operated, the linear bearings 147a and 147b slide along respective rails 78a and 78b, causing the base 231 and linear solidification devices 44a and 44b to travel therewith along the travel (x) axis.

Pneumatic cylinder assembly (which may be a hydraulic cylinder assembly) 259 includes a pneumatic cylinder 261 having a piston (not shown) movably disposed therein. The piston is attached to one end of pneumatic cylinder shaft 264. The other end of the pneumatic cylinder shaft 264 is attached to a shaft support bracket 268 at connection point 272 (FIG. 12B). A bottom surface 270 of shaft support bracket 268 is fixedly attached to vacuum blade support member 225. Pneumatic cylinder 261 is attached to a mounting bracket 262 on a surface of the base 231. As air is supplied to pneumatic cylinder 261 (the supply line is not shown), the shaft 264 extends and applies a force against shaft support bracket 268, which pushes the bracket 268 and the vacuum blade support member 225 away from the base 231 and the linear solidification devices 44a and 44b. When shaft 264 is fully extended, the vacuum blade 48 is spaced apart from the linear solidification devices 44a and 44b by an offset distance in a first direction along the travel (x) axis. Correspondingly, when air is withdrawn from pneumatic cylinder 261, shaft 264 retracts within cylinder 261. When shaft 264 is fully retracted, the vacuum blade 48 is spaced apart from linear solidification devices 44a and 44b by the offset distance in a second direction along the travel (x) axis. The indexing plates 236a and 236b and spring plungers 246a and 246b (FIGS. 10C-10E) may be used in the example of FIGS. 12A and 12B as well so that the pneumatic cylinder assembly 259 to adjust the position of the vacuum blade 48 relative to the linear solidification devices 44a and 44b between two indexed positions defined by detents 238a, 238b on the one hand and 240a, 240b on the other hand.

Instead of a hydraulic cylinder assembly or the pneumatic cylinder assembly 259, a solenoid may be energized and deenergized to adjust a suitable actuating apparatus and reposition the vacuum blade 48 relative to the linear solidification devices 44a, 44b along the travel axis.

Figure 12A:
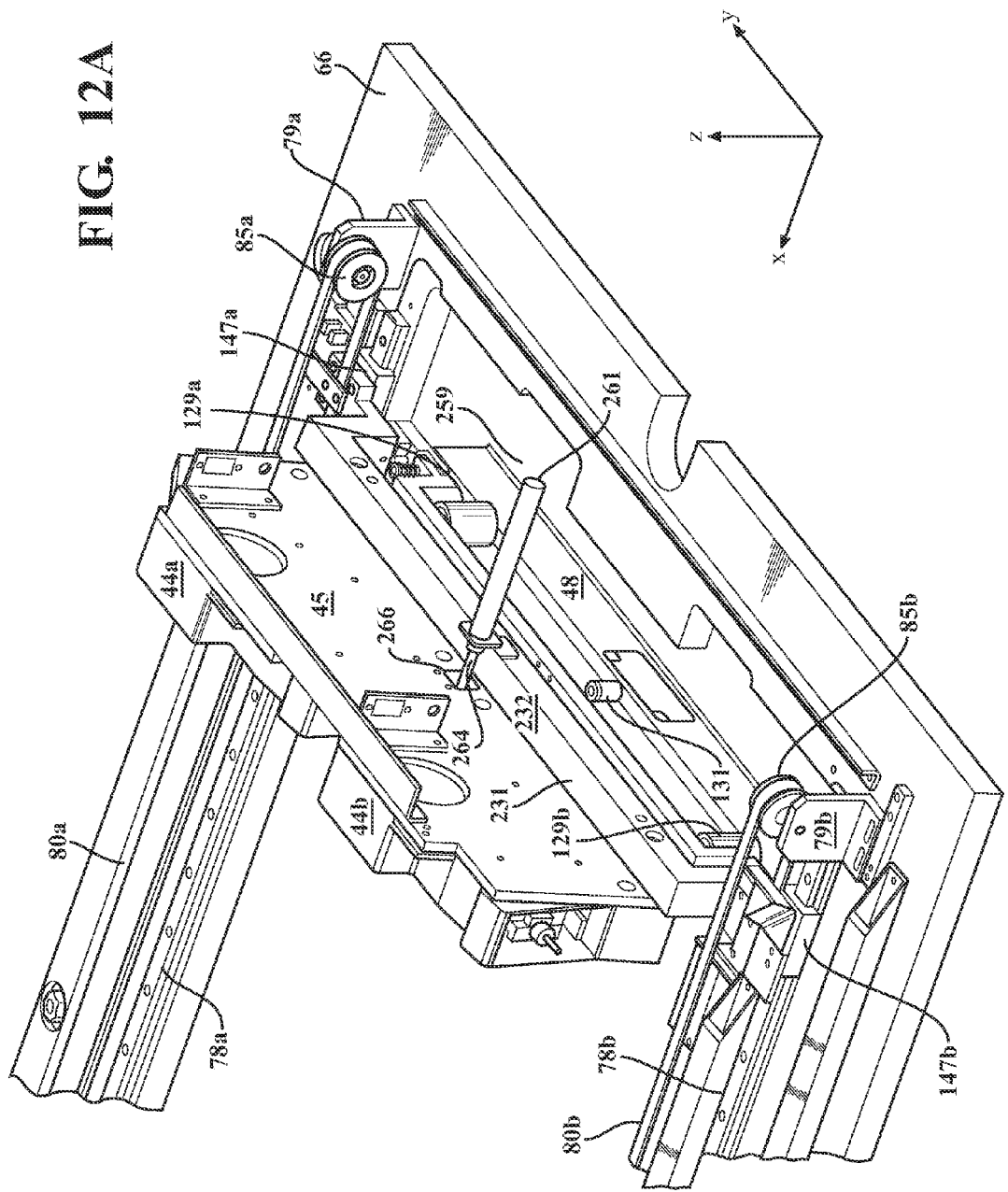
FIG. 12A is a first perspective close-up view of another alternative solidification assembly comprising a pneumatic cylinder assembly for repositioning a vacuum blade relative to linear solidification devices.
Figure 12B:
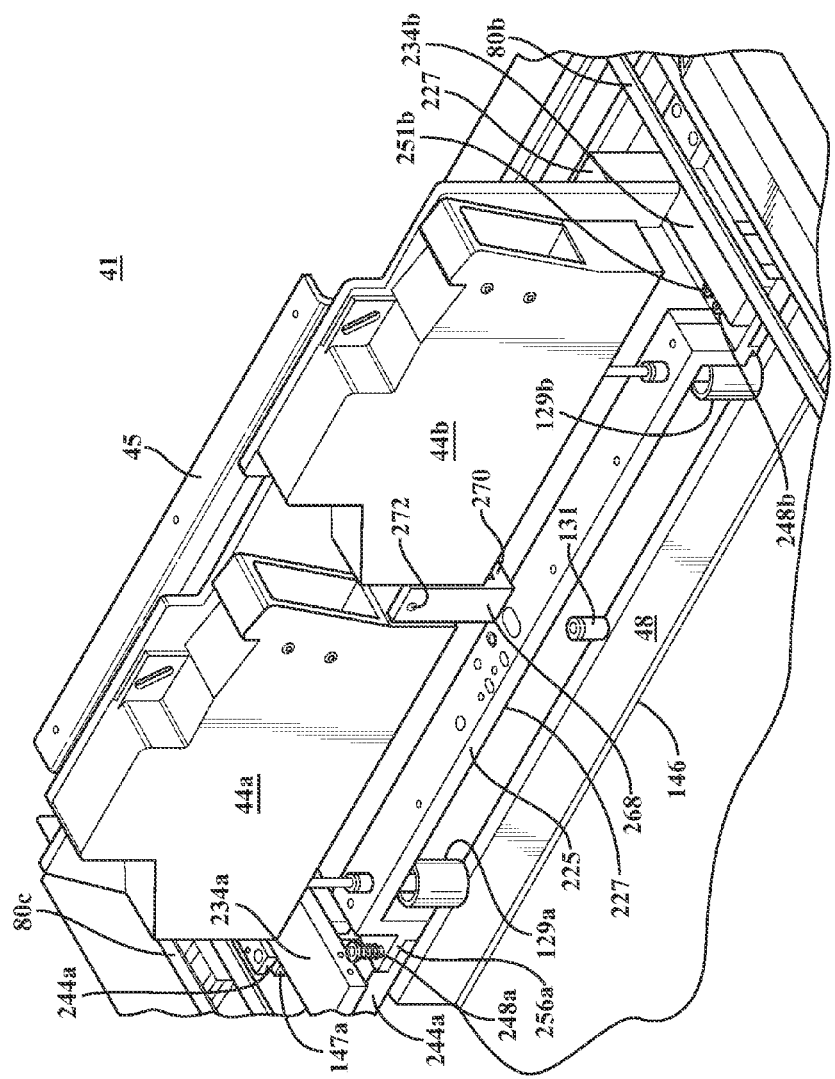
FIG. 12B is a second perspective close-up view of the solidification assembly of FIG. 12A.

In contrast to the examples of FIGS. 10A-10E and 11, the solidification assembly 70 of FIGS. 12A-12B can operated so that the vacuum blade 48 either leads or trails the linear solidification devices 44a and 44b during an object solidification operation. Controller 360 is simply programmed to adjust the pneumatic cylinder pressure to provide the offset direction that is desired. Thus, in the solidification assembly of FIGS. 12A-12B provides more flexibility than the solidification assemblies 71 of FIGS. 10A-10E or 11.

The present invention has been described with reference to certain exemplary embodiments thereof However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method of making a three-dimensional object from a solidifiable material, comprising:
   first traversing a linear solidification device and a blade along a first travel direction along a travel axis while the linear solidification device scans solidification energy onto an exposed surface of the solidifiable material along a scanning axis, wherein during the first traversing step, the blade remains spaced apart from the linear solidification device by a fixed distance in a first blade spacing direction along the travel axis;
   second traversing the linear solidification device and the blade along a second travel direction along the travel axis, wherein during the second traversing step, the blade remains fixed apart from the linear solidification device by the fixed distance in a second blade spacing direction along the travel axis, wherein the second blade spacing direction is opposite the first blade spacing direction; and
   traversing the linear solidification device along the travel axis relative to the blade.

2. The method of claim 1, wherein the first blade spacing direction is in the first travel direction, and the second blade spacing direction is in the second travel direction.

3. The method of claim 1, wherein the first blade spacing direction is in the second travel direction, and the second blade spacing direction is in the first travel direction.

4. The method of claim 1, further comprising engaging the blade or a blade support member with an engagement surface.

5. The method of claim 4, wherein the step of engaging the blade or the blade support member with an engagement surface is performed after the first traversing step and before the second traversing step.

6. The method of claim 1, wherein the step of traversing the linear solidification device along the travel axis relative to the blade comprises traversing the linear solidification device in the second travel direction while exerting a releasable locking force in the first travel direction against the blade or a blade support member until the linear solidification device is spaced apart from the blade by the fixed distance in the second travel direction along the travel axis.

7. The method of claim 1, wherein the step of traversing the linear solidification device along the travel axis relative to the blade comprises adjusting a flow of hydraulic or pneumatic actuator fluid.

8. The method of claim 1, wherein the step of traversing the linear solidification device along the travel axis relative to the blade comprises energizing a solenoid.

9. The method of claim 1, further comprising adjusting a position of a level compensator in the solidifiable material along a build axis to control a height of the exposed surface of the solidifiable material along the build axis.

10. The method of claim 1, further comprising adjusting a position of a level compensator in the solidifiable material along a build axis to control a distance between the exposed surface of the solidifiable material and the blade along the build axis.

* * * * *